(12) United States Patent
Paunicka et al.

(10) Patent No.: US 10,266,267 B2
(45) Date of Patent: Apr. 23, 2019

(54) SYSTEMS AND METHODS FOR IN-FLIGHT RETRIEVAL OF UNMANNED AERIAL VEHICLES

(71) Applicant: The Boeing Company, Chicago, IL (US)

(72) Inventors: James Louis Paunicka, St. Louis, MO (US); Jacob R. Irwin, St. Peters, MO (US); Alexander David Lee, St. Peters, MO (US); Ryan L. Hupp, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 520 days.

(21) Appl. No.: 15/175,453

(22) Filed: Jun. 7, 2016

(65) Prior Publication Data

US 2017/0349283 A1    Dec. 7, 2017

(51) Int. Cl.
*B64D 5/00* (2006.01)
*B64C 39/02* (2006.01)

(52) U.S. Cl.
CPC .............. *B64D 5/00* (2013.01); *B64C 39/024* (2013.01); *B64C 2201/182* (2013.01); *B64C 2201/206* (2013.01)

(58) Field of Classification Search
CPC ........ B64C 2201/206; B64C 2201/182; B64D 5/00
See application file for complete search history.

(56) References Cited

U.S. PATENT DOCUMENTS

| | | | |
|---|---|---|---|
| 6,869,042 B2 | 3/2005 | Harrison | |
| 7,188,807 B2 | 3/2007 | Smith | |
| 7,900,866 B2* | 3/2011 | Kutzmann | B64C 39/024 244/1 TD |
| 8,231,083 B2* | 7/2012 | Kutzmann | B64C 39/024 244/137.4 |
| 8,464,981 B2* | 6/2013 | Goldie | B64C 39/024 244/110 C |

(Continued)

OTHER PUBLICATIONS

Printout of webpage, "*USS Macon* (ZRS-5)," Wikipedia, the free encyclopedia, wikipedia.com, downloaded Feb. 22, 2016, last updated Feb. 4, 2016.

(Continued)

*Primary Examiner* — Philip J Bonzell
*Assistant Examiner* — Michael B Kreiner
(74) *Attorney, Agent, or Firm* — DASCENZO Intellectual Property Law, P.C.

(57) ABSTRACT

Presently disclosed systems and methods are configured for in-flight retrieval of unmanned aerial vehicles (UAVs). Such systems generally include a retrieval ramp, a tether system including a tether, and a capture connector. The retrieval ramp is configured to be moved between a stowed configuration and an extended configuration, in which at least a portion of the retrieval ramp is positioned outside the aircraft for retrieval of the UAV. The tether system is moveable to a capture configuration, in which a terminal tether end of the tether is positioned beyond a terminal end of the retrieval ramp, typically outside of turbulence generated by the aircraft. The system is configured to position the retrieval ramp, the tether system, and the capture connector in order to engage the UAV with the capture connector. Once captured, the system may move the UAV into the aircraft as the tether is retracted towards a retracted configuration.

21 Claims, 10 Drawing Sheets

(56) References Cited

U.S. PATENT DOCUMENTS

| | | | |
|---|---|---|---|
| 8,991,793 B1 | 3/2015 | Bernhardt | |
| 9,132,916 B2* | 9/2015 | Hanna | B64C 39/024 |
| 9,878,777 B2* | 1/2018 | Bernhardt | B64C 21/04 |
| 9,896,208 B2* | 2/2018 | Retig | B64D 5/00 |
| 2016/0221689 A1* | 8/2016 | Tridico | B64F 1/04 |
| 2017/0144762 A1* | 5/2017 | Retig | B64D 5/00 |
| 2017/0197725 A1* | 7/2017 | Foo | B64C 39/024 |
| 2017/0341735 A1* | 11/2017 | Bernhardt | B64C 21/04 |

OTHER PUBLICATIONS

Printout of webpage, "*McDonnell XF-85 Goblin*," Wikipedia, the free encyclopedia, wikipedia.com, downloaded Feb. 22, 2016, last updated Jan. 24, 2016.

Printout of webpage article, "*The Mothership—UAV swarms inspire research into flying aircraft carriers*," Airforce Technology Market & Customer Insight, airforce-technology.com, downloaded Feb. 22, 2016, dated Feb. 10, 2015.

D. Stratman, "*The Gathering Swarm*," Boeing Frontiers, p. 20, Dec. 2011-Jan. 2012.

Printout of webpage article, R. Boyle, "*In Boeing Demonstration, Different Autonomous Drones Swarm Together for Reconnaissance Missions*," Popular Science, popsci.com, downloaded Feb. 22, 2016, dated Aug. 22, 2011.

B.D. Nelson et al., Document AD 529372, "*Investigation of a Micro-Fighter/Airborne Aircraft Carrier Concept*," Tactical Combat Aircraft Programs, The Boeing Aerospace Company, Air Force Flight Dynamics Laboratory, Air Force Systems Command, Wright-Patterson Air Force Base, Ohio, AFFDL TR 73-93 (vol. 1), Sep. 1973.

* cited by examiner

SYSTEMS AND METHODS FOR IN-FLIGHT RETRIEVAL OF UNMANNED AERIAL VEHICLES

FIELD

The present disclosure relates to systems and methods for in-flight retrieval of unmanned aerial vehicles.

BACKGROUND

Unmanned aerial vehicles (UAVs), unmanned aircraft systems (UASs), or simply "drones" are aircraft without a human pilot aboard. UAVs are utilized to perform various military, commercial, and residential functions that may be difficult, dangerous, or too remote to be performed using manned aircraft. Typically, one or more UAVs are launched from a ground-based launch point, and then recovered (also referred to as "retrieved") back to the launch point after performing their intended function. Retrieval of the UAV may allow for the UAV to be refueled, rearmed, and/or potentially redeployed for the same or a later mission. UAVs typically are launched from the ground, from ships, or from aircraft. Often, UAVs are launched from a location close to the mission location, which may endanger any ground forces or operators at the launch point. The retrieval location may be the same as the launch point, close to the launch point, or remote from the launch point. Having a fixed retrieval location limits the range and effectiveness of the UAV, because the UAV must reserve fuel to return to the retrieval location. Attempts at developing a system that provides for mobile retrieval locations for UAV capture (e.g., using a carrier aircraft, or "mother" aircraft) have met with difficulties, due to, for example, turbulence near the carrier aircraft, slow retrieval processes, and/or limited capabilities (e.g., only capable of retrieving a single UAV).

SUMMARY

Presently disclosed systems and related methods for in-flight retrieval of one or more unmanned aerial vehicles (UAVs) may address one or more issues existing in the prior art. One example of a presently disclosed system for retrieving an airborne UAV (e.g., capturing the airborne UAV, transferring it to an aircraft, and loading the UAV into the aircraft) while the aircraft is airborne generally includes a retrieval ramp, a tether system, and a capture connector. The retrieval ramp has an elongate surface extending from a first end of the retrieval ramp to a terminal end of the retrieval ramp, and the retrieval ramp is configured to be selectively and reversibly moved between a stowed configuration and an extended configuration. In the stowed configuration, the retrieval ramp is contained within the aircraft, and in the extended configuration, at least the terminal end of the retrieval ramp is positioned outside of the aircraft and turbulence generated by the aircraft (e.g., below the turbulence, or otherwise positioned to avoid the turbulence), for capture of the UAV. The tether system has a tether extending from an initial tether end to a terminal tether end, and the tether system is selectively and reversibly moveable between a retracted configuration, in which the terminal tether end is positioned inside the aircraft, and a capture configuration, in which the terminal tether end is positioned outside the aircraft, beyond the terminal end of the retrieval ramp (e.g., the terminal tether end may also be positioned in a location which is a safe distance from the aircraft and outside the turbulence generated by the aircraft).

The capture connector is coupled to the terminal tether end of the tether and is configured to engage the UAV outside of any turbulence generated by the aircraft. The system is configured to position the retrieval ramp, the tether system, and the capture connector in order to capture the UAV, by engaging the UAV with the capture connector. Once captured, the system is configured to move the UAV into the aircraft, utilizing the retrieval ramp, as the tether is retracted towards the retracted configuration.

Related methods may include approaching the UAV with the aircraft, lowering the retrieval ramp from the aircraft towards the extended configuration, and extending a tether of the tether system towards a capture configuration, wherein, in the capture configuration, the capture connector at the terminal tether end of the tether is positioned beyond a terminal end of the retrieval ramp such that the tether is configured to capture the UAV outside of turbulence generated by the aircraft. Such methods may also include measuring relative locations and velocities of the aircraft and the UAV, positioning the aircraft based on the measured relative locations and velocities, capturing the UAV by engaging the capture connector with a UAV connector coupled to the UAV, and moving the UAV into the aircraft via the tether and the retrieval ramp.

DESCRIPTION

Figure 1:
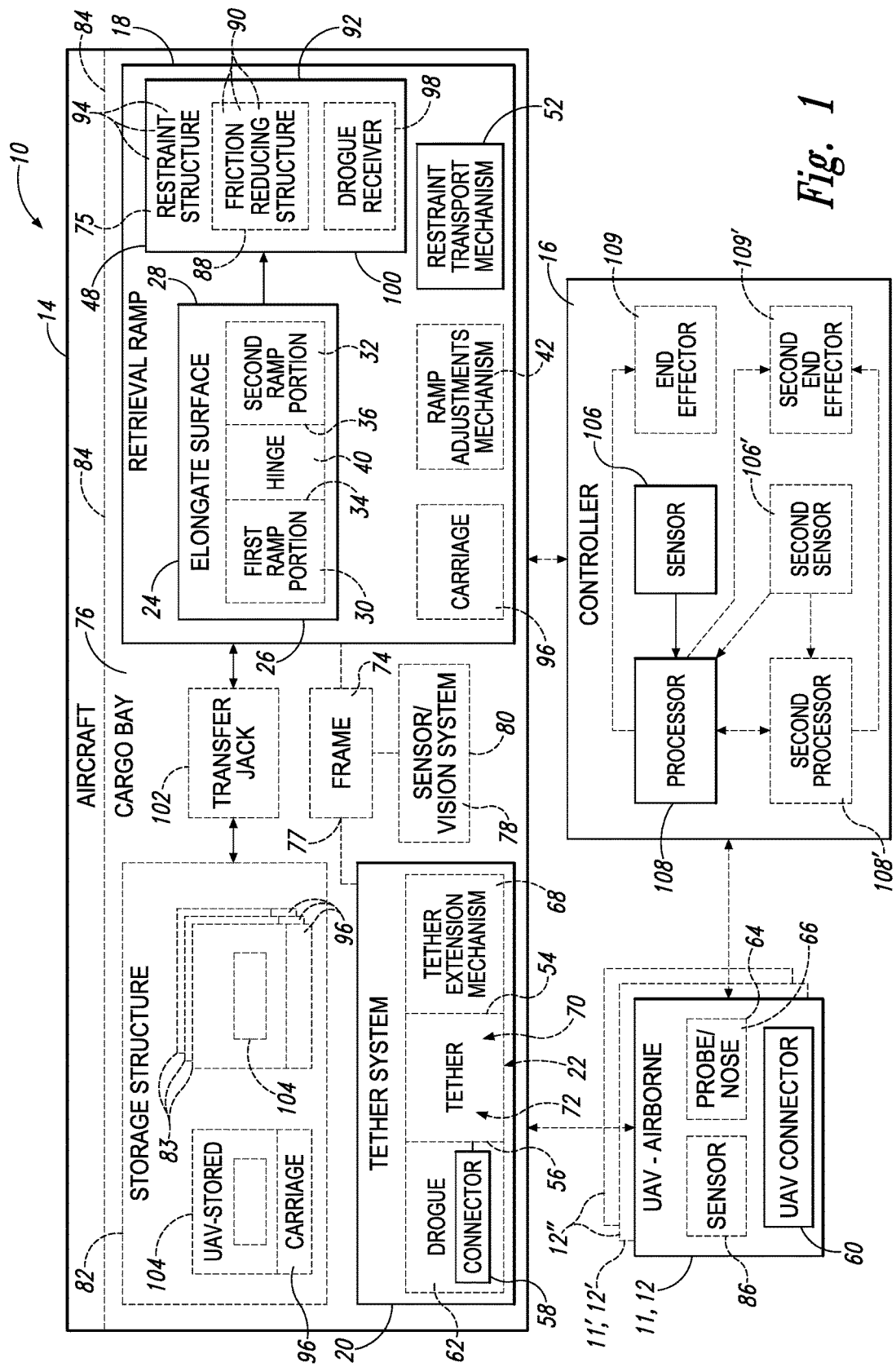
FIG. 1 is a schematic view of illustrative, non-exclusive examples of systems for capturing a UAV and loading the UAV into an aircraft while the aircraft is airborne, according to the present disclosure.

As schematically illustrated in FIG. 1, systems 10 of the present disclosure are configured for capturing one or more UAVs 12 and loading each UAV 12 captured by a system 10 to an aircraft 14. Systems 10 are configured to capture a respective UAV 12 and transfer it to aircraft 14 while UAV 12 and aircraft 14 are airborne. As used herein, a respective UAV 12 is "captured" when it is engaged with, coupled to, and/or at least partially restrained by system 10. A respective UAV 12 is "loaded" within aircraft 14 when the UAV has been placed inside aircraft 14 by system 10. Systems 10 may include aircraft 14, one or more airborne UAVs 12 (which are also referred to herein as simply UAVs 12, or as UAV 12), and/or a controller 16. Some systems 10 may be at least partially contained within aircraft 14. To retrieve UAV 12 while airborne (e.g., capture UAV 12 and transfer UAV 12 to aircraft 14), systems 10 include a retrieval ramp 18 and a tether system 20. Generally, at least a portion of retrieval ramp 18 may be moved (e.g., lowered) towards an extended configuration such that it is positioned outside of aircraft 14 (e.g., in the airstream behind aircraft 14), and a tether 22 of tether system 20 may be extended towards a capture configuration in order to capture UAV 12. After UAV 12 is captured, tether 22 may be retracted towards a retracted configuration to draw UAV 12 into aircraft 14. As designated herein, UAVs are generally designated as UAV 12, while a respective UAV 12 that is airborne may be designated as an airborne UAV 11, a respective UAV 12 that has been captured may be designated as a captured UAV 13, and a respective UAV 12 that has been captured, loaded, and stored within aircraft 14 may be designated as a stored UAV 104, however, the respective UAV 12 is the same respective UAV 12 whether it is airborne, captured, or stored. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Retrieval ramp 18 is configured to be selectively and reversibly moved between a stowed configuration in which retrieval ramp 18 is contained within aircraft 14, and the extended configuration. For example, an elongate surface 24 of retrieval ramp 18 may be selectively and reversibly moveable with respect to aircraft 14 in order to move retrieval ramp 18 between the stowed and extended configurations. In some examples, elongate surface 24 of retrieval ramp 18 may extend from a first end 26 to a terminal end 28, wherein first end 26 remains positioned inside aircraft 14, and terminal end 28 is positioned outside of aircraft 14 when retrieval ramp 18 is in the extended configuration. Retrieval ramp 18 is configured to be deployed to a plurality of different positions with respect to aircraft 14 when extended towards the extended configuration. For example, retrieval ramp 18 may be configured to be deployed to a plurality of different distances and positions relative to aircraft 14, such that the position of terminal end 28 relative to aircraft 14 is adjustable, such as to avoid turbulence produced by aircraft 14.

Additionally or alternatively, elongate surface 24 of retrieval ramp 18 may include a first ramp portion 30 and a second ramp portion 32. In such examples, first ramp portion 30 may extend from first end 26 of elongate surface 24 to a second end 34 of first ramp portion 30, and second ramp portion 32 may extend from a proximal end 36 of second ramp portion 32 to terminal end 28 of elongate surface 24. First ramp portion 30 and second ramp portion 32 may be coupled to one another adjacent second end 34 of first ramp portion 30 and proximal end 36 of second ramp portion 32. Second ramp portion 32 and first ramp portion 30 may be rotationally disposed with respect to one another such that a ramp angle 38 (FIG. 9) formed between first ramp portion 30 and second ramp portion 32 is adjustable as second ramp portion 32 is rotated with respect to first ramp portion 30. For example, retrieval ramp 18 may include a hinge 40 coupled to first ramp portion 30 adjacent second end 34 of first ramp portion 30, and to second ramp portion 32 adjacent proximal end 36 of second ramp portion 32, thereby hinging first ramp portion 30 and second ramp portion 32 with respect to one another. In some such systems 10, retrieval ramp 18 may include a ramp adjustment mechanism 42 configured to adjust ramp angle 38 between first ramp portion 30 and second ramp portion 32. For example, ramp adjustment mechanism 42 may be configured to rotate second ramp portion 32 with respect to first ramp portion 30, thereby adjusting the position of terminal end 28 of elongate surface 24 of retrieval ramp 18. As retrieval ramp 18 is moved towards the extended configuration, at least a portion of second ramp portion 32 may be positioned outside of aircraft 14 (e.g., ramp adjustment mechanism 42 may be configured to extend at least a portion of retrieval ramp 18 into the airstream behind aircraft 14).

Retrieval ramp 18 may be configured such that there is at least a 45 degree range of rotation, at least a 60 degree range of rotation, at least a 90 degree range of rotation, at least a 120 degree range of rotation, at least a 150 degree range of rotation, and/or at least a 180 degree range of rotation of second ramp portion 32 with respect to first ramp portion 30. Ramp angle 38 (FIG. 9) is defined as 0 degrees (0°) when first ramp portion 30 and second ramp portion 32 are parallel with each other. In the stowed configuration of retrieval ramp 18, ramp angle 38 (FIG. 9) may be a positive angle, and/or, in the extended configuration, ramp angle 38 (FIG. 9) may be a negative angle. For example, in the extended configuration shown in FIG. 9, retrieval ramp 18 has a negative ramp angle 38' that is negative in value, measured from a ramp angle of 0° as indicated by dashed line 44. Dashed line 46 indicates a positive ramp angle 38" having a positive value, such as may be the case when retrieval ramp 18 is in the stowed configuration and second ramp portion 32 is rotated up into aircraft 14. Ramp adjustment mechanism 42 may be configured to position retrieval ramp 18 such that any desired ramp angle 38 within the range of rotation may be formed between second ramp portion 32 and first ramp portion 30. For example, ramp adjustment mechanism 42 may be configured to position at least a portion of retrieval ramp 18 outside of aircraft 14 as retrieval ramp 18 is moved towards the extended configuration, and to move retrieval ramp 18 into aircraft 14 as retrieval ramp 18 is moved towards the stowed configuration. In some systems 10, at least a portion of retrieval ramp 18 may be telescoping such that it extends in length in addition to or instead of changing angle with respect to aircraft 14.

Returning now to FIG. 1, retrieval ramp 18 includes a restraint structure 48 configured to at least partially secure a captured UAV (e.g., captured UAV 13, of FIG. 3) with respect to elongate surface 24 of retrieval ramp 18 (e.g., with respect to second ramp portion 32). Restraint structure 48 may be configured to be selectively and reversibly moved with respect to elongate surface 24 of retrieval ramp 18 (e.g., fore and aft with respect to elongate surface 24). For example, restraint structure 48 may be configured to be selectively and reversibly moved with respect to first ramp portion 30 (e.g., fore and aft with respect to first ramp portion 30) and with respect to second ramp portion 32 of retrieval ramp 18 (e.g., fore and aft with respect to second ramp portion 32). In some systems 10, restraint structure 48 may be configured to slide from first ramp portion 30 to second ramp portion 32. In some systems 10, at least a portion of restraint structure 48 may extend past elongate surface 24 (e.g., past terminal end 28 of elongate surface 24) when retrieval ramp 18 is in the extended configuration and restraint structure 48 is positioned for capture of a respective UAV.

Restraint structure 48 may be configured to at least partially restrain a respective UAV 12 once the respective UAV is secured within restraint structure 48, such as while the respective UAV is moved through turbulence generated by aircraft 14 (e.g., turbulent air 50 shown in FIG. 3) and/or as the respective UAV is moved into aircraft 14. For example, restraint structure 48 may be configured to at least substantially prevent lateral movement of the captured UAV with respect to elongate surface 24 of retrieval ramp 18 (e.g., with respect to first ramp portion 30 and second ramp portion 32), once the captured UAV is secured within restraint structure 48. Restraint structure 48 may be configured to secure the captured UAV in at least 1 degree of freedom, at least 2 degrees of freedom, at least 3 degrees of freedom, at least 4 degrees of freedom, at least 5 degrees of freedom, and/or at least 6 degrees of freedom, with respect to elongate surface 24 of retrieval ramp 18. In some systems 10, restraint structure 48 at least partially encloses the captured UAV, as it is moved into aircraft 14. Retrieval ramp 18 may include a restraint transport mechanism 52 that is configured to move restraint structure 48 with respect to elongate surface 24 of retrieval ramp 18 (e.g., with respect to first ramp portion 30 and second ramp portion 32) and/or with respect to aircraft 14. Thus, restraint transport mechanism 52 may move restraint structure 48 along retrieval ramp 18 to position restraint structure 48 for receiving a captured UAV 13, and restraint transport mechanism 52 may again move restraint structure 48 and the captured UAV contained therein, with respect to retrieval ramp 18, after the captured UAV is secured within restraint structure 48, thereby moving the captured UAV towards and into aircraft 14.

Tether system 20 is configured to be used with retrieval ramp 18 to capture UAV 12 and transfer UAV 12 to aircraft 14. Tether 22 extends from an initial tether end 54 to a terminal tether end 56. Generally, initial tether end 54 remains coupled to system 10 and positioned within aircraft 14, while terminal tether end 56 is extended out of aircraft 14 as tether system 20 is moved towards the capture configuration to capture an airborne UAV 11. Tether system 20 is selectively and reversibly moveable between the retracted configuration, in which terminal tether end 56 may be positioned inside aircraft 14, and the capture configuration, in which terminal tether end 56 is positioned outside aircraft 14 in a position suitable for capturing UAV 12.

Tether 22 has a length (e.g., the distance between initial tether end 54 and terminal tether end 56) sufficient for capturing and transferring UAV 12 to aircraft 14. Tether system 20 also includes a capture connector 58 disposed at or near terminal tether end 56 of tether 22. Capture connector 58 is configured to engage UAV 12, thereby capturing it such that as tether system 20 is retracted towards the retracted configuration and terminal tether end 56 is pulled in towards aircraft 14, UAV 12 is pulled along with tether 22 and capture connector 58. For example, UAV 12 includes a UAV connector 60 configured to be engaged with capture connector 58 of tether system 20, such that UAV 12 is captured by system 10 when UAV connector 60 and capture connector 58 are engaged with one another. In some examples, tether 22 may be configured to grasp or otherwise be coupled to UAV 12 without a UAV connector 60 present on a given UAV 12.

Tether system 20 is generally arranged with respect to retrieval ramp 18 such that a portion of tether 22 is disposed within or through restraint structure 48 of retrieval ramp 18 when tether system 20 is extended towards the capture configuration. In such a configuration, terminal tether end 56 and capture connector 58 may be positioned beyond terminal end 28 of retrieval ramp 18 (e.g., a portion of tether 22 may extend beyond elongate surface 24 of retrieval ramp 18). As used herein, the term "beyond" refers to a position more distant from the aircraft. Thus, terminal tether end 56 of tether 22 is positioned "beyond" terminal end 28 of retrieval ramp 18 when terminal tether end 56 is farther from aircraft 14 than is terminal end 28 of retrieval ramp 18.

A drogue 62 may be coupled to terminal tether end 56 of tether 22 such that drogue 62 may be configured to receive at least a portion of UAV 12 as the UAV is captured. For example, drogue 62 may be shaped to receive a nose portion 64 and/or a probe 66 of UAV 12, such that once UAV 12 is captured by system 10, nose portion 64 and/or probe 66 is positioned at least partially within drogue 62 of system 10 (e.g., nose portion 64 and/or probe 66 of UAV 12 may be configured to be inserted into drogue 62 as UAV 12 is captured). In some examples, drogue 62 may be substantially funnel-shaped. Capture connector 58 may be disposed within drogue 62. In other systems 10, any suitable structure may be coupled to terminal tether end 56 in place of drogue 62, or tether 22 may simply end at capture connector 58 without an additional structure.

Tether system 20 may include a tether extension mechanism 68 configured to selectively and reversibly extend tether 22 towards the capture configuration and retract tether 22 towards the retracted configuration. For example, tether extension mechanism 68 may include a spool, a reel, a winch, a pulley, and/or a retractable cord reel. Tether 22 may include a stowed portion 70 that is stowed about or within tether extension mechanism 68, and an extended portion 72 that is not stowed about or within tether extension mechanism 68. For example, stowed portion 70 may be the respective portion of tether 22 that is wrapped or wound around a reel (e.g., tether extension mechanism 68), while extended portion 72 may be the respective portion of tether 22 that is not wrapped or wound around the reel, and therefore extends away from the reel. Generally, stowed portion 70 includes initial tether end 54 such that initial tether end 54 is engaged with tether extension mechanism 68. Extended portion 72 may extend away from tether extension mechanism 68, such as towards a frame 74 that may link components of system 10 together.

In some examples, in the retracted configuration, a respective length of stowed portion 70 is greater than a respective length of extended portion 72 (e.g., because a majority of tether 22 may be stowed about tether extension mechanism 68 in the retracted configuration). By contrast, in the capture configuration, a respective length of extended portion 72 may be greater than a respective length of stowed portion 70 (e.g., because a majority of tether 22 may be unwound from tether extension mechanism 68 and extended out of aircraft 14). Similarly, a respective length of stowed portion 70 in the retracted configuration is generally greater than a respective length of stowed portion 70 in the capture configuration, and a respective length of extended portion 72 in the capture configuration is generally greater than a respective length of extended portion 72 in the retracted configuration. In other words, stowed portion 70 and extended portion 72 are not static lengths or portions of tether 22, and the relative portion of tether 22 that is stowed or extended may change as the tether system 20 is moved between the retracted configuration and the capture configuration. Generally, stowed portion 70 is positioned within aircraft 14, such as within a cargo bay 76 of aircraft 14. On the other hand, at least a portion of extended portion 72 may be positioned outside aircraft 14. In some configurations, a portion of extended portion 72 may be positioned within cargo bay 76, and a portion of extended portion 72 may be positioned outside aircraft 14.

Tether 22 may be any suitable material, but in some examples may be an elongate, flexible cable. Tether 22 may be constructed of any material having suitable strength, weight and flexibility characteristics. For example, tether 22 may comprise woven fibers, KEVLAR®, one or more metals, such as steel, alloys, and/or one or more polymers, such as nylon. In some examples, existing tethers may be adapted for use with presently disclosed systems 10. For example, aerial refueling hoses may be adapted to serve as a tether 22 in presently disclosed systems 10. The flexibility of tether 22 may be configured such that forces acting on either aircraft 14 or UAV 12 are not transferred through tether 22 (e.g., forces acting on either aircraft 14 or the UAV 12 may be absorbed by tether 22 as it flexes).

Systems 10 may include frame 74 positioned within aircraft 14. In some systems, frame 74 may be coupled to aircraft 14 such that frame 74 is substantially immovable with respect to aircraft 14. Additionally or alternatively, frame 74 may be installed non-permanently such that it is selectively and reversibly removable from aircraft 14 and/or selectively moveable with respect to aircraft 14. Frame 74 may link one or more components of system 10 to one another. For example, retrieval ramp 18 and tether system 20 may be coupled to frame 74. In some examples, first ramp portion 30 of elongate surface 24 of retrieval ramp 18 may be coupled to frame 74 such that frame 74 supports first ramp portion 30. In some systems 10, frame 74 may be integrally formed with at least a portion of retrieval ramp 18 such that retrieval ramp 18 may include frame 74. Additionally or alternatively, ramp adjustment mechanism 42 may be coupled to frame 74, such that frame 74 supports ramp adjustment mechanism 42. Additionally or alternatively, frame 74 may be configured to guide and position tether 22 extending from within aircraft 14 (e.g., extended portion 72 of tether 22), thereby facilitating positioning of terminal tether end 56 beyond elongate surface 24 (e.g., beyond terminal end 28 of retrieval ramp 18) and beyond restraint structure 48. For example, terminal tether end 56 of tether 22 may extend away from tether extension mechanism 68 and be guided by frame 74 such that extended portion 72 of tether 22 extends along retrieval ramp 18 and through restraint structure 48. In some systems 10, extended portion 72 of tether 22 extends from tether extension mechanism 68, towards frame 74, and passes through a tether guide 77 coupled to the frame.

Additionally or alternatively, frame 74 may be configured to mount a vision system 78 and/or one or more aircraft-based sensors 80. Vision system 78 and/or aircraft-based sensors 80 may be movable in some systems 10. In some systems 10, frame 74 may be configured to aim and/or position vision system 78 such that its field of regard (e.g., the total area that can be captured by vision system 78) is sufficient to facilitate the capture of a UAV 12. For example, frame 74 may have a minimum height in order to facilitate such field of regard. Frame 74 also may be configured to aim and/or position various system components such that the respective components do not interfere with one another. For example, frame 74 may guide tether 22 such that the respective portion of tether 22 within aircraft 14 is held above and out of the way of other system components, such as a storage structure 82 for storing retrieved UAVs and first ramp portion 30 of retrieval ramp 18. In this manner, frame 74 may be configured to prevent tether 22 from interfering with transfer of a captured UAV to storage structure 82. Frame 74 may be positioned adjacent an aircraft door 84 that provides access to a cargo bay 76 of aircraft 14.

Aircraft 14 may be any suitable aircraft. In some examples, aircraft 14 may be a carrier aircraft or a cargo aircraft. Aircraft 14 may be specifically designed and built for UAV launch and/or retrieval in some examples. In other examples, aircraft 14 may be a converted aircraft, such as a cargo airlifter that has been converted to house system 10 for retrieval of airborne UAVs. Aircraft 14 may be piloted, autonomous, and/or remotely piloted in various examples. Retrieval ramp 18, tether system 20, and/or controller 16 may be housed inside aircraft 14. Additionally or alternatively, aircraft 14 may include one or more aircraft-based sensors 80 configured to facilitate retrieval of UAV 12, frame 74, and/or one or more stored UAVs 104 that have previously been captured. For example, one or more system components may be housed within (e.g., positioned within and/or coupled to) cargo bay 76 of aircraft 14. In some such examples, as retrieval ramp 18 is moved towards the extended configuration, at least a portion of retrieval ramp 18 (e.g., second ramp portion 32) may be moved out of cargo bay 76. At least a portion of retrieval ramp 18 may be mounted in cargo bay 76. For example, first ramp portion 30 may be mounted in cargo bay 76. Additionally or alternatively, one or more system components may be coupled to the exterior of aircraft 14. For example, one or more aircraft-based sensors 80 may be mounted on or coupled to the exterior of the aircraft in some examples.

UAV 12 may be any suitable UAV that generally includes one or more UAV connectors 60, one or more probes 66, and/or a nose portion 64. Probe 66 may be configured to send and/or receive wireless data, such as regarding location and velocity of the UAV and/or aircraft 14. UAV 12 may be a fixed-wing UAV or may have one or more foldable wings. In some systems 10, UAV 12 may be a rotorcraft, a quadcopter, an atmospheric re-entry vehicle, or any other unmanned aerial vehicle. UAV 12 may include one or more UAV sensors 86 configured to facilitate retrieval of the UAV. UAVs 12 may be controlled remotely by an operator located on the ground, in aircraft 14, or in another vehicle or aircraft, or UAV 12 may be fully autonomous. UAV 12 may be configured for any type of task or mission, and/or for recreational use. For example, UAV 12 may be configured to perform one or more of the following types of tasks before being captured by system 10: target and decoy, reconnaissance, combat, logistics/cargo operations, research and development, civil and commercial applications, military, aerial surveying (e.g., crops), acrobatic aerial footage in filmmaking, search and rescue, inspecting power lines and pipelines, counting wildlife, delivering medical or other supplies to remote or inaccessible areas, environment monitoring, border patrol, convoy protection, forest fire detection, surveillance, coordinating humanitarian aid, plume tracking, land surveying, fire and accident investigation, detection of illegal activities (e.g., hunting; landfill activities), landslide measurement, crowd monitoring, traffic, recreation, and construction industry tasks. UAV 12 may be configured for varying ranges and altitudes of flight, as desired.

Some systems 10 may include one or more additional features and/or components as desired in individual applications. For example, restraint structure 48 may include one or more friction-reducing structures 88 configured to reduce friction between at least a portion of restraint structure 48 and a UAV 12 captured by system 10, as UAV 12 is drawn into restraint structure 48 (e.g., positioned at least partially within restraint structure 48). For example, friction-reducing structures 88 may be provided in the form of one or more rollers 90, where each roller 90 is configured to rotate about its respective longitudinal axis. In some systems 10, one or more rollers 90 coupled to restraint structure 48 are configured to rotate about their respective longitudinal axes when contacted by a captured UAV 13, as UAV is pulled into restraint structure 48 and is moved with respect to the rollers 90. In this manner, rollers 90 may reduce friction between UAV 12 and restraint structure 48. Additionally or alternatively, one or more friction-reducing structures 88 may be configured to guide UAV 12 into restraint structure 48. As such, one or more friction-reducing structures 88 may be positioned within an aft end region 92 of restraint structure 48, where a captured UAV enters restraint structure 48.

Restraint structure 48 may take any suitable shape or form. In some systems 10, restraint structure 48 may be configured to receive many different types, sizes, and/or shapes of UAVs. In one specific example, restraint structure 48 may include a plurality of spaced-apart arches 94 that are configured to receive a captured UAV. For example, each spaced-apart arch 94 may connect opposing lateral end regions of restraint structure 48. In some examples, one or more friction-reducing structures 88 may be positioned on and/or coupled to one or more respective spaced-apart arches 94 of restraint structure 48.

Systems 10 may include one or more carriages 96 each configured to longitudinally slide with respect to elongate surface 24 of retrieval ramp 18 (e.g., with respect to first ramp portion 30 and/or second ramp portion 32) and/or with respect to restraint structure 48. Each respective carriage 96 may thereby be configured to facilitate transfer of a captured UAV into aircraft 14. For example, retrieval ramp 18 may be configured such that as restraint structure 48 is moved with respect to elongate surface 24 of retrieval ramp 18, carriage 96 is moved with respect to elongate surface 24 as well. In some systems 10, carriage 96 may serve as a lower support for a captured UAV, such that the captured UAV is positioned between carriage 96 and restraint structure 48. Some systems 10 may include a plurality of carriages 96, such that there is a respective carriage 96 for each respective UAV the system is configured to capture. Carriage 96 may slide along retrieval ramp 18 as the captured UAV is pulled into aircraft 14, and may travel with the captured UAV into aircraft 14, such as into a respective space of storage structure 82. In some such examples, each respective carriage 96 may be stored in storage structure 82 until use. During use, the respective carriage 96 may be positioned on retrieval ramp 18 and moved along with restraint structure 48 (with respect to elongate surface 24 of retrieval ramp 18) to a position for capturing the next respective UAV 12. When positioned for capturing a respective airborne UAV 11, at least a portion of carriage 96 may be positioned to extend beyond elongate surface 24 of retrieval ramp 18 and/or beyond aft end region 92 of restraint structure 48.

Restraint structure 48 of some systems 10 may include a drogue-receiver 98 within a fore end region 100 of the restraint structure (fore end region 100 being opposite aft end region 92 of restraint structure 48). Said drogue-receiver 98 may be configured to engage drogue 62 of tether system 20. For example, as tether 22 and associated drogue 62 are drawn into aircraft 14 (e.g., as tether system 20 is moved towards the retracted configuration), drogue 62 may be pulled into drogue-receiver 98 of restraint structure 48. In some examples, drogue-receiver 98 may be configured to allow passage of tether 22 through an opening therein, but may simultaneously prevent passage of drogue 62 there through. For example, drogue-receiver 98 may have a complementary shape to that of drogue 62, such as being basket-like and/or substantially conical, thereby being configured to receive drogue 62, yet prevent its passage through drogue-receiver 98.

Drogue-receiver 98 may, in some examples, be coupled to or integrally formed with a respective spaced-apart arch 94 of restraint structure 48. In some systems 10, drogue-receiver 98 may be configured to be selectively and reversibly moved between a transfer configuration and a delivery configuration. In the transfer configuration, drogue-receiver 98 may be configured to prevent a captured UAV from being pulled off fore end region 100 of restraint structure 48 as the captured UAV is transferred into aircraft 14. In the delivery configuration, drogue-receiver 98 may be moved such that it is positioned such that the captured UAV may be transferred from restraint structure 48 to aircraft 14, passing by fore end region 100 of restraint structure 48. For example, drogue-receiver 98 may be configured to rotate with respect to restraint structure 48 as drogue-receiver 98 is moved from the transfer configuration to the delivery configuration. In this manner, once close to or back within aircraft 14 after capturing UAV 12 outside of aircraft 14, drogue-receiver 98 may be rotated with respect to restraint structure 48 such that drogue-receiver 98 is moved out of the way to allow passage of the captured UAV. UAV 12 (e.g., captured UAV 13 shown in FIG. 3) may then be removed from restraint structure 48 and placed within aircraft 14, such as into storage structure 82. In other examples, drogue-receiver 98 may be transitioned to the delivery configuration by mechanisms other than rotating with respect to the rest of restraint structure 48. For example, drogue-receiver 98 may be slid to the delivery configuration, opened laterally to the delivery configuration, moved vertically to the delivery configuration, expanded to the delivery configuration, and/or any other any other movement may be performed to transition drogue-receiver 98 to the delivery configuration to allow passage of the captured UAV. Alternatively, in some systems 10 without a drogue, drogue-receiver 98 may be replaced with a different suitable structure to engage terminal tether end 56, or may be absent altogether.

Systems 10 may include one or more storage structures 82 positioned within aircraft 14. Storage structure 82 is configured for receiving and storing one or more UAVs 12 captured by system 10. Some storage structures 82 include one or more storage cells 83 (or storage locations 83), each of which serves as a space for a respective captured UAV. Respective storage cells 83 may be structurally separated from one another (such as by one or more side walls), or may simply be designated spaces within storage structure 82 without a physical barrier between respective storage cells 83. Each storage cell 83 may include a respective carriage 96. One or more storage cells 83 may contain a stored UAV 104, which may be a respective airborne UAV 11 that has been captured by system 10. In some systems, storage structure 82 may be separated from other components of the system (e.g., from frame 74) by a distance that is greater than or equal to the respective length of a respective captured UAV 13. In these systems 10, captured UAVs 13 may be transferred from retrieval ramp 18 to storage structure 82 after the captured UAV is brought into aircraft 14.

For example, in some systems, a transfer jack 102 may be included to transfer a captured UAV from retrieval ramp 18 and/or restraint structure 48, into aircraft 14 (e.g., into storage structure 82 contained within aircraft 14). Transfer jack 102 may be selectively moveable between a first position adjacent retrieval ramp 18, frame 74, and/or restraint structure 48, and a second position remote from the first position. For example, the second position may be adjacent storage structure 82. A respective captured UAV may be placed onto transfer jack 102 and moved away from retrieval ramp 18, restraint structure 48, and/or frame 74. Transfer jack 102 may then move (e.g., translate, raise, lower, tilt, and/or rotate) the captured UAV to another location or position within aircraft 14, such as to or towards storage structure 82.

Transfer jack 102 may be configured to selectively and reversibly raise and lower a respective UAV 12 positioned on transfer jack 102, such that once a respective captured UAV has been transferred from retrieval ramp 18 to storage rack 82 (or to another location within aircraft 14), transfer jack 102 may raise and/or lower the UAV to the desired position or location. For example, transfer jack 102 may transfer a captured UAV away from retrieval ramp 18, and deposit the captured UAV in storage structure 82. In examples where storage structure 82 includes a plurality of storage cells 83 having different heights, transfer jack 102 may raise or lower so as to deposit the captured UAV in the desired respective storage space, and/or so as to obtain a respective carriage 96 from a respective storage space for retrieval of the next airborne UAV (e.g., airborne UAV 11').

Controller 16 may generally include one or more sensors 106 (e.g., first sensor 106, second sensor 106', etc.) and one or more processors 108 (e.g., first processor 108, second processor 108', etc.). Sensors 106 may be configured to measure the relative position and velocity between components of system 10. For example, first sensor 106 may be configured to measure the relative position and velocity between aircraft 14 and a respective airborne UAV 11, while second sensor 106' may be configured to measure the relative position and velocity between UAV connector 60 of the respective airborne UAV 11 and capture connector 58 of system 10. In some systems 10, controller 16 may include a single sensor configured to measure both relative position and velocity between aircraft 14 and UAV 12 as well as between UAV connector 60 and capture connector 58.

Processors 108 may be configured to process data from one or more sensors 106. In one example, first processor 108 may be configured to process data from first sensor 106, and second processor 108' may be configured to process data from second sensor 106'. In some examples, first processor 108 may be configured to process data from both first sensor 106 and second sensor 106'. Processors 108 are generally configured to guide aircraft 14 and airborne UAV 11 to a given relative position and velocity to facilitate capture of the UAV, and/or to guide and engage a respective UAV connector 60 of a respective airborne UAV 11 with capture connector 58, thereby capturing airborne UAV 11 (at which point UAV 12 is designated captured UAV 13).

Controller 16 may be configured to selectively position retrieval ramp 18 in the stowed configuration, the extended configuration, and any position or arrangement there between. For example, controller 16 may be configured to position retrieval ramp 18 in response to measured relative positions and velocities of aircraft 14 and airborne UAV 11. Similarly, controller 16 may be configured to position tether system 20 in the retracted configuration, the capture configuration, and any position or arrangement there between, such as in response to measured relative positions and velocities of aircraft 14 and airborne UAV 11. To this end, controller 16 may be configured to control restraint transport mechanism 52 and/or tether extension mechanism 68 in some systems 10.

Controller 16 is autonomous in some systems 10. In some systems 10, controller 16 is semi-autonomous. Controller 16 may be wholly or partially contained within aircraft 14 in some systems 10. In other systems, controller 16, or a portion thereof, may be positioned remotely from aircraft 14. As indicated in dashed lines in FIG. 1, respective sensors 106 and processors 108 may be configured to transmit data and/or instructions wirelessly between respective sensors 106 and processors 108. Controller 16 may be configured to compensate for turbulence generated by and near aircraft 14. For example, controller 16 may be configured to position retrieval ramp 18, restraint structure 48, terminal tether end 56, and/or drogue 62 to avoid areas of turbulent air, such that capture of UAV 12 (e.g., engagement of UAV connector 60 with capture connector 58) occurs in an area outside of (e.g., lower than, higher than, to one side or the other of, beyond, etc.) the turbulence.

Sensors 106 may be any suitable sensor. In some systems, one or more sensors 106 (e.g., first sensor 106) may include a GPS system. Additionally or alternatively, one or more sensors 106 (e.g., second sensor 106') may include a LIDAR system. Other suitable sensors may include a radio frequency apparatus, a satellite guidance apparatus, a visual guidance system, and/or any other type of sensors. In some specific systems 10, controller 16 is configured to generate and execute instructions that, when executed, cause first processor 108 to generate navigation control signals for directing airborne UAV 11 to a relative position and velocity based on sensor information received from first sensor 106. Additionally or alternatively, controller 16 may be configured to generate and execute instructions that, when executed, cause second processor 108' to generate navigation control signals for directing airborne UAV 11 to a relative position and velocity based on sensor information received from second sensor 106' so that UAV connector 60 and capture connector 58 are engaged with one another. In some systems 10, controller 16 may include one or more end effectors 109 (e.g., first end effector 109 and/or second end effector 109'), each of which may receive data from one or more processors (e.g., from first processor 108 and/or second processor 108') and perform one or more tasks to cause and/or facilitate positioning of one or more system components for capture of UAV 12. In some systems 10, controller 16 may send wireless signals for one or more system components to cause or facilitate positioning for capture of UAV 12.

Systems 10 may be configured to be installed within and/or at least partially positioned within one or more different aircraft 14. In some examples, systems 10 may be configured to be reversibly installed within a respective aircraft 14, selectively removed from said aircraft, and installed within a different respective aircraft. For example, components of systems 10 (e.g., retrieval ramp 18, tether system 20, controller 16, storage structure 82, frame 74, and/or transfer jack 102) may be modular and selectively removable as a system or individually from a given aircraft 14. In one specific example, system 10 may be palletized, such that it may be slid into or out of a respective cargo bay of an aircraft (e.g., cargo bay 76 of aircraft 14). Systems 10 may be configured to be adapted to a plurality of configurations of respective aircraft (e.g., systems 10 may be configured for use within a plurality of different types and/or sizes of aircraft 14).

Systems 10 may be configured to retrieve a plurality of respective airborne UAVs (e.g., airborne UAV 11, airborne UAV 11', airborne UAV 11", etc.). Generally, system 10 is configured to capture multiple respective UAVs serially, such that the system is configured to be placed in a receiving configuration to capture a first respective UAV, moved towards a retrieval configuration to transfer the first respective UAV to the aircraft, and then system 10 may be moved back towards the receiving configuration to capture a second respective UAV, and so on. However, system 10 may be configured to capture more than one respective airborne UAV 11 at a time. In the receiving configuration, system 10 is configured to receive a respective captured UAV within the aircraft. For example, tether system 20 may be moved towards the retracted configuration, retrieval ramp 18 may be moved towards the stowed configuration, and/or drogue-receiver 98 may be moved towards the delivery configuration as system 10 is moved towards the retrieval configuration. Similarly, in the retrieval configuration, system 10 is configured to capture an airborne UAV 11. Accordingly, tether system 20 may be moved towards the capture configuration, retrieval ramp 18 may be moved towards the extended configuration, and/or drogue-receiver 98 may be moved towards the transfer configuration as system 10 is moved towards the receiving configuration. In the receiving configuration and/or when not in use, system 10 may be configured to be contained within aircraft 14, such that a door 84 to cargo bay 76 may be closed, whereas in the retrieval configuration, portions of system 10 are positioned outside of aircraft 14.

In some examples, system 10 may be configured to redeploy, or relaunch, one or more UAVs 12 captured by the system, and/or systems 10 may be configured to deploy or launch a respective UAV 12 regardless of whether it was previously retrieved by system 10 or otherwise located inside aircraft 14. For example, a respective UAV 12 may be removed from storage structure 82, transferred out of aircraft 14 via tether system 20 and retrieval ramp 18, and released into the airstream outside of aircraft 14 by decoupling the UAV's UAV connector 60 from capture connector 58 of system 10, thereby (re)deploying UAV 12. In (re)launching or (re)deploying a given UAV 12, system 10 may perform functions in reverse order than when retrieving an airborne UAV. While systems 10 and components described above are generally described with reference to capturing a respective UAV 12, it should be understood that said systems 10 and components thereof may be configured to transfer UAVs out of the aircraft in addition to or instead of transferring UAVs into the aircraft. Additionally or alternatively, systems 10 may be configured to recharge, refuel, and/or reconfigure one or more captured UAVs. To this end, aircraft 14 may contain components used in the refueling, rearming and/or servicing of UAV 12. For example, aircraft 14 may contain fuel, armaments, spare parts, extra pilots, etc. For extended missions, aircraft 14 may include sleeping quarters for pilots and other personnel. Personnel aboard aircraft 14 may perform refueling, rearming and/or servicing of the UAV 12. In other examples, aircraft 14 may include an autonomous refueling/rearming/servicing system, and may be completely unmanned.

Turning now to FIGS. 2-9, illustrative non-exclusive examples of systems 10 are illustrated, in the form of system 110 (which is an example of system 10). Where appropriate, the reference numerals from the schematic illustrations of FIG. 1 are used to designate corresponding parts of system 110; however, the examples of FIGS. 2-9 are non-exclusive and do not limit systems 10 to the illustrated embodiments of system 110. That is, systems 10 are not limited to the specific embodiments of the illustrated system 110, and systems 10 may incorporate any number of the various aspects, configurations, characteristics, properties, etc. of systems 10 that are illustrated in and discussed with reference to the schematic representations of FIG. 1 and/or the embodiments of FIGS. 2-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to system 110; however, it is within the scope of the present disclosure that the previously discussed features, variants, etc. may be utilized with the same.

Figure 2:
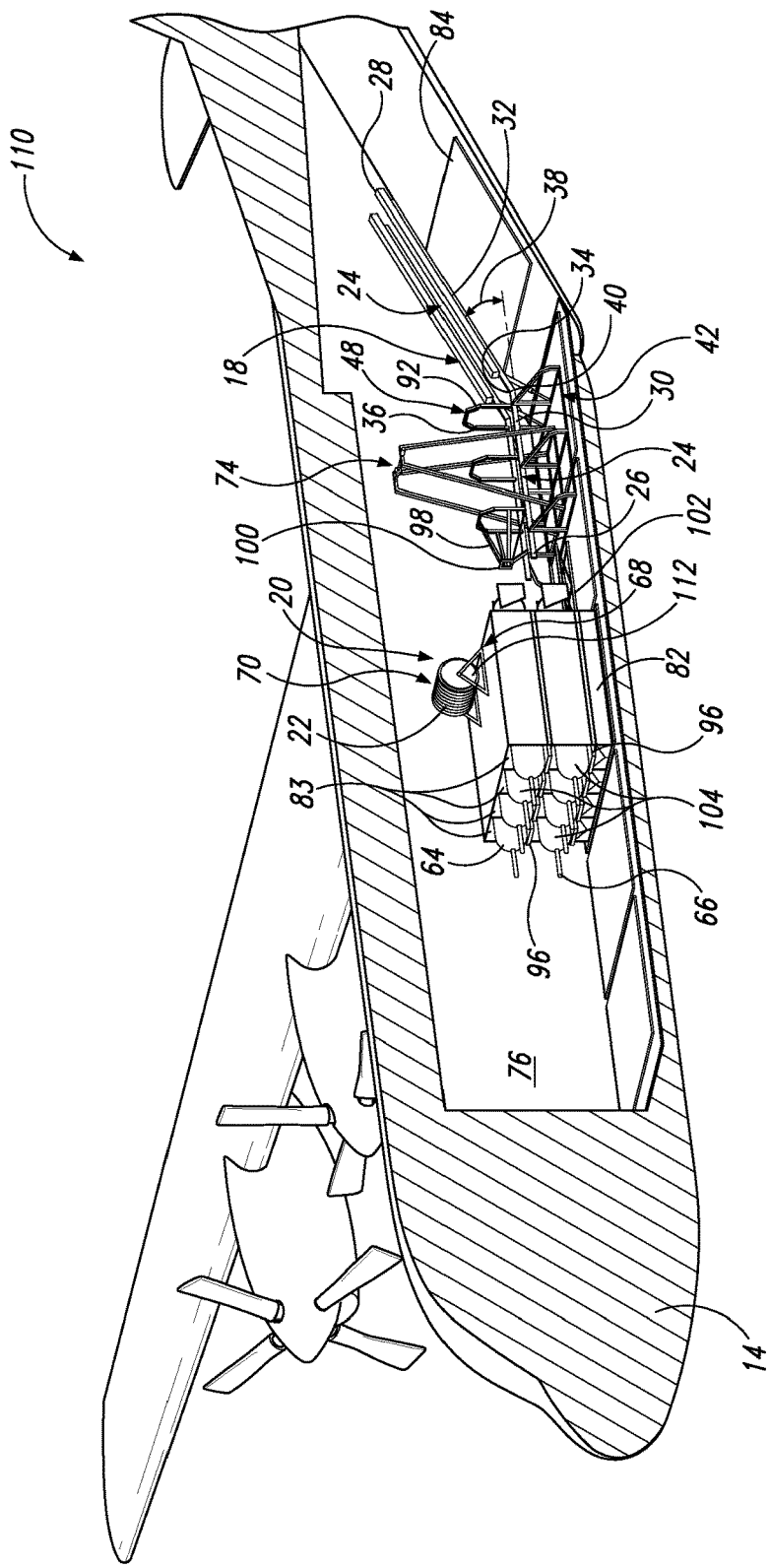
FIG. 2 is a perspective cutaway view of an aircraft containing an example of a system according to the present disclosure, with the cargo bay closed and the system contained within the aircraft.

FIG. 2 illustrates a schematic view of system 110 in a stowed configuration. Aircraft 14 is shown with a cutaway view, so that the rest of system 110 may be visible as positioned inside cargo bay 76 of aircraft 14. As shown in FIG. 2, aircraft door 84 is closed, and thus the system components (e.g., storage structure 82, tether system 20, frame 74, retrieval ramp 18, and restraint structure 48) are all wholly contained within cargo bay 76 of aircraft 18. As so positioned, tether system 20 is in its retracted configuration, retrieval ramp 18 is in its stowed configuration, and drogue-receiver 98 is in its transfer confirmation. As shown in FIG. 2, second ramp portion 32 is tilted upwards from first ramp portion 30 of retrieval ramp 18, such that ramp angle 38 has a positive value. This configuration may be advantageous for closure of aircraft door 84. Storage structure 82 as shown in FIG. 2 includes a respective stored UAV 104 and a respective carriage 96 in each respective storage cell 83. While storage structure 82 includes eight storage cells 83 (e.g., storage structure 82 accommodates eight stored UAVs 104), storage structure 82 may be configured to store more or fewer stored UAVs 104 (e.g., storage structure 82 may include more or fewer storage cells 83 than illustrated in some examples). As shown in the stowed configuration of FIG. 2, tether 22 is almost entirely wrapped around a reel 112 (which is an example of tether extension mechanism 68), such that the length of stowed portion 70 of tether 22 is much greater than the length of extended portion 72 of tether 22.

Figure 3:
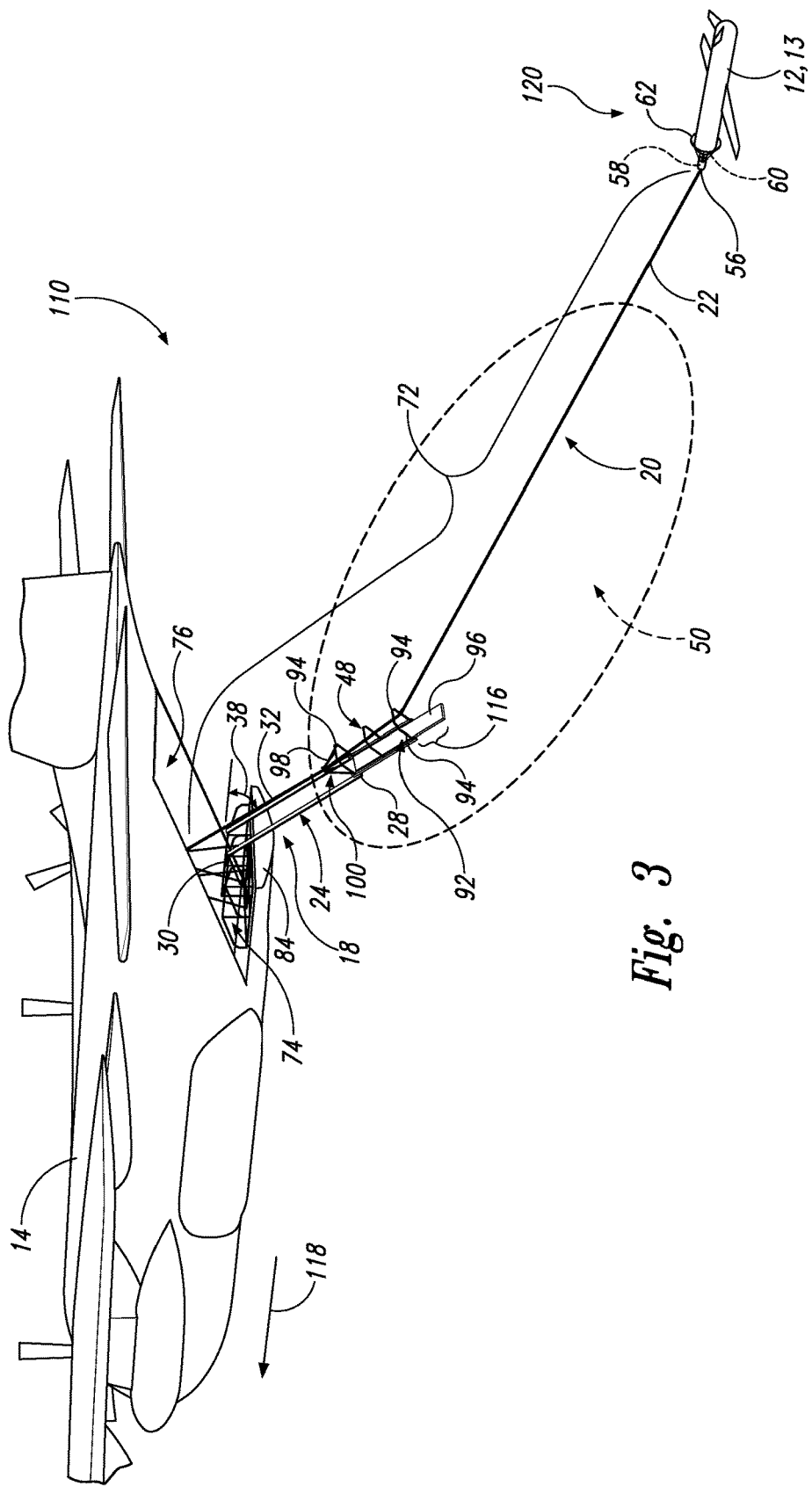
FIG. 3 is a perspective view of an example of a system according to the present disclosure, with the cargo bay open, the retrieval ramp in an extended configuration, and the tether in a capture configuration, illustrating capture of a UAV while the system is in a retrieval configuration.
Figure 4:
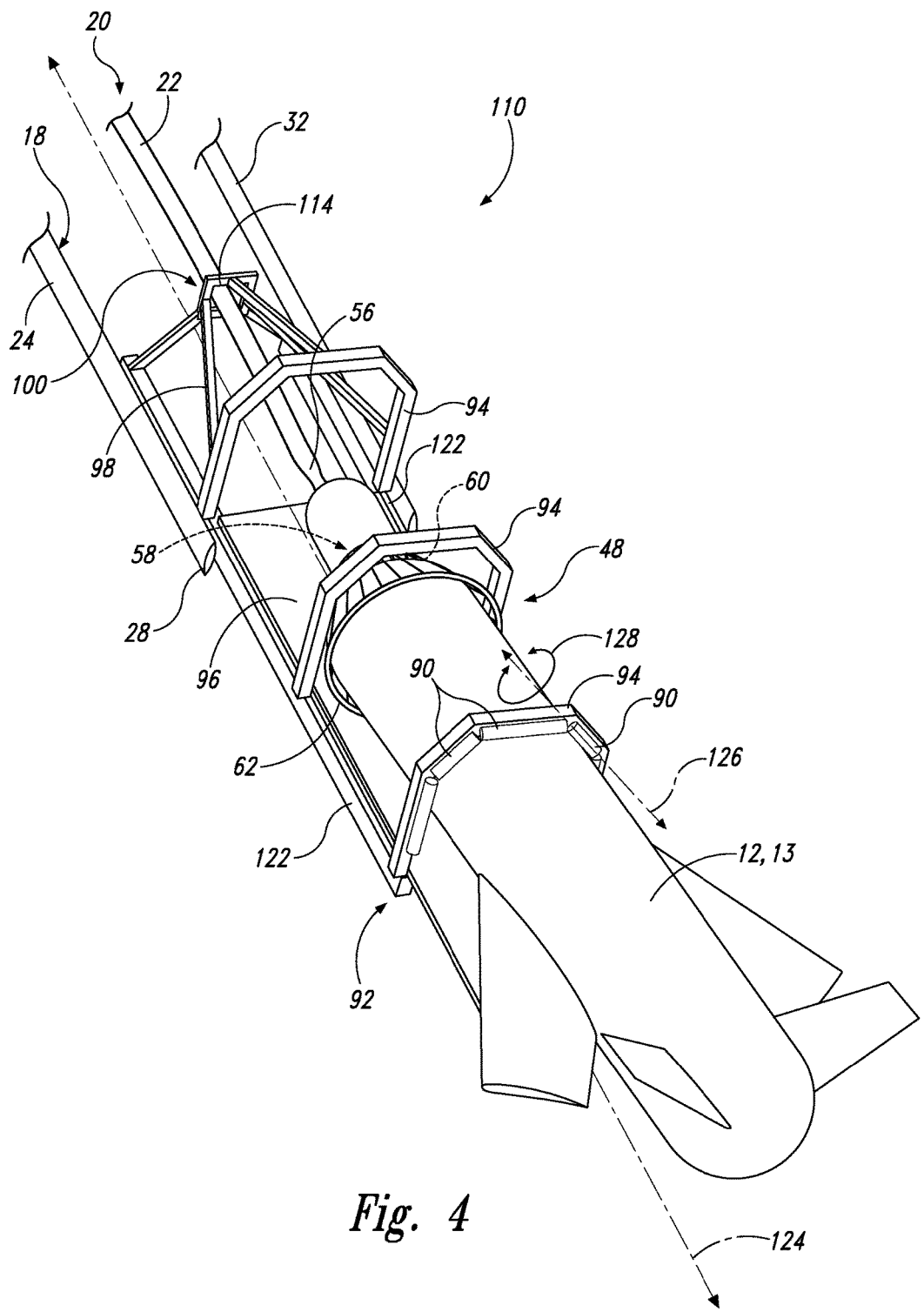
FIG. 4 is a perspective view of a UAV being pulled into a restraint structure of the retrieval ramp via retracting the tether after engaging the tether with the UAV.

FIG. 3 illustrates system 110 of FIG. 2, having been moved to a retrieval configuration for capture of an airborne UAV 11 (shown as captured UAV 13). In contrast with the stowed configuration shown in FIG. 2, in FIG. 3, aircraft door 84 is open, retrieval ramp 18 has been moved towards the extended configuration, tether system 20 has been moved towards the capture configuration, and capture connector 58 adjacent terminal tether end 56 of tether 22 has been engaged with UAV connector 60 of UAV 12 to capture the UAV. As shown in FIG. 3, when captured, at least a portion of UAV 12 is positioned within drogue 62 adjacent terminal tether end 56. Capture connector 58 is disposed within drogue 62. Second ramp portion 32 has been rotated downwards with respect to first ramp portion 30, such that ramp angle 38 has a negative value and second ramp portion 32 extends downward, out of aircraft 14. First ramp portion 30 remains within aircraft 14, secured to frame 74. Extended portion 72 of tether 22 has been unwound from reel 112 (shown in FIG. 2), and tether 22 passes through an opening 114 in drogue-receiver 98 of restraint structure 48 (opening 114 is best seen in FIG. 4), and then is disposed to pass through restraint structure 48 as shown.

As positioned for capturing an airborne UAV 11 (shown as captured UAV 13 in FIG. 3), carriage 96 is positioned such that at least a portion of carriage 96 extends beyond elongate surface 24 (e.g., beyond terminal end 28 of elongate surface 24) of retrieval ramp 18, and beyond aft end region 92 of restraint structure 48. For example, a portion 116 of carriage 96 is positioned beyond aft end region 92 of restraint structure 48 in FIG. 3. Substantially all of carriage 96 is positioned beyond terminal end 28 of retrieval ramp 18. Additionally, frame 74 is configured to guide and position tether 22 extending from within aircraft 14 (e.g., extended portion 72 of tether 22), thereby facilitating positioning of terminal tether end 56 beyond elongate surface 24 (e.g., beyond terminal end 28 of retrieval ramp 18) and beyond aft end region 92 of restraint structure 48. Accordingly, drogue 62 and capture connector 58 (each of which are situated adjacent terminal tether end 56 in system 110) are positioned beyond terminal end 28 of retrieval ramp 18 and beyond aft end region 92 of restraint structure 48, as shown.

FIG. 3 schematically illustrates an area of turbulence 50 (also referred to herein as turbulent air 50), generated by and adjacent aircraft 14. Such area of turbulence 50 is often generated by aircraft in areas of the airstream near aircraft 14 and/or behind aircraft 14 (relative to the direction of travel of aircraft 14, indicated by arrow 118), as shown in FIG. 3. System 110 is configured to capture UAV 12 at a capture location 120 that is positioned outside area of turbulence 50 (e.g., above, below, beyond, and/or to the side of the turbulence). Capture location 120 is the location in space where UAV 12 is captured (e.g., where capture connector 58 of tether system 20 is engaged with UAV connector 60 of UAV 12). Capturing UAV 12 outside area of turbulence 50 may lessen difficulties of capture that may be caused by turbulent air 50.

As shown in FIG. 3, terminal tether end 56 of tether 22, drogue 62, and capture connector 58 are each positioned beyond area of turbulence 50 in the illustrated receiving configuration of system 110. In some systems, terminal end 28 of retrieval ramp 18 also may be positioned below, beyond, or otherwise outside of area of turbulence 50, in its extended configuration.

FIG. 4 illustrates a close-up view of a respective captured UAV 13 being drawn into restraint structure 48 of system 110, as tether system 20 is transitioned towards the retracted configuration. As compared with the configuration illustrated in FIG. 3, the length of extended portion 72 of tether 22 has been reduced by tether extension mechanism 68 (FIG. 2) such that terminal tether end 56 is drawn closer to and back towards aircraft 14. As terminal tether end 56 and drogue 62 are drawn into aircraft 14 (such as by reeling in tether 22 and/or by adjusting the position of restraint structure 48 relative to retrieval ramp 18, such as via restraint transport mechanism 52 of FIG. 1), captured UAV 13 is drawn into restraint structure 48 and onto carriage 96, as shown in FIG. 4. As tether 22 is further retracted towards the retracted configuration, captured UAV 13 will be further drawn into restraint structure 48 until drogue 62 is drawn into drogue-receiver 98 of tether system 20. Tether 22 passes through opening 114 in drogue-receiver 98, but drogue-receiver 98 is configured to prevent drogue 62 and captured UAV 13 from being pulled or drawn entirely through restraint structure 48, while drogue-receiver 98 is in the transfer configuration shown.

As best seen in FIG. 4, restraint structure 48 of system 110 includes a plurality of spaced-apart arches 94 configured to receive captured UAV 13. Restraint structure 48 of system 110 includes three such spaced-apart arches 94, but other examples may include more or fewer spaced-apart arches 94, or a different configuration altogether. Restraint structure 48 generally may take any suitable form such that it sufficiently restrains captured UAV 13 during capture and transfer of the UAV to aircraft 14. As shown in FIG. 4, spaced-apart arches 94 connect opposing lateral end regions 122 of restraint structure 48 in some examples. Planes defined by spaced-apart arches 94 are substantially orthogonal to a longitudinal axis 124 of restraint structure 48, in some examples. Drogue-receiver 98 is integrally formed with one respective arch 94 of the spaced-apart arches 94 in some examples. In other examples, drogue-receiver 98 may be coupled to a respective arch 94 of restraint structure 48, or otherwise coupled to restraint structure 48 adjacent fore end region 100 of restraint structure 48.

Restraint structure 48 of system 110 includes a plurality of friction-reducing structures 88 in the form of a plurality of rollers 90. Friction-reducing structures 88 generally are positioned within aft end region 92 of restraint structure 48 such that captured UAV 13 contacts and engages friction-reducing structures 88 as it is pulled into restraint structure 48. In system 110, captured UAV 13 contacts rollers 90 (which are coupled to a respective spaced-apart arch 94 in some examples) as the UAV enters restraint structure 48, thereby causing rollers 90 to rotate about each roller's respective longitudinal axis 126, as indicated by arrow 128, thereby reducing friction between captured UAV 13 and restraint structure 48. While rollers 90 are shown in system 110 of FIG. 4, other systems may include more, fewer, and/or a different arrangement of friction-reducing structures 88. While rollers 90 are illustrated coupled to or adjacent the respective spaced-apart arch 94 nearest aft end region 92 of restraint structure 48, other respective spaced-apart arches 94 may include one or more friction-reducing structures 88 in addition to or instead of the illustrated rollers 90.

Figure 5:
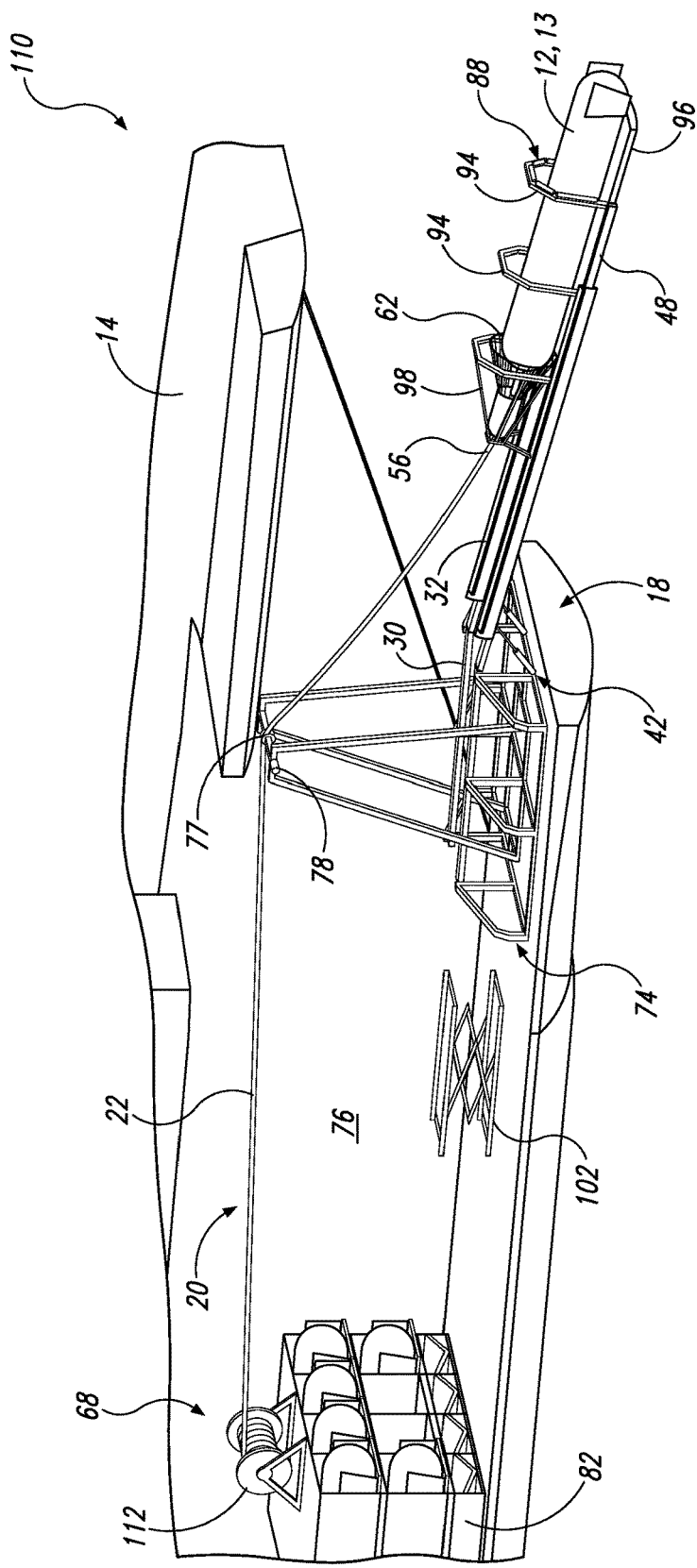
FIG. 5 is a perspective view of a system according to the present disclosure, with the system in a receiving configuration, showing the UAV in process of being loaded into the aircraft.

FIG. 5 illustrates system 110 being further transitioned towards the receiving configuration. In FIG. 5, as compared to the configurations of FIGS. 3-4, retrieval ramp 18 has been raised and adjusted such that second ramp portion 32 is almost parallel with first ramp portion 30, and tether system 20 has been further retracted towards the retracted configuration by winding tether 22 about reel 112. Accordingly, terminal tether end 56 is once again near aircraft 14, and as tether 22 is further retracted, restraint structure 48 and carriage 96 translate longitudinally with respect to retrieval ramp 18, thereby bringing captured UAV 13 into aircraft 14.

As best seen in FIG. 5, frame 74 of system 110 includes tether guide 77, through which tether 22 passes as it extends from tether extension mechanism 68 and out of aircraft 14. Frame 74 is configured to position tether guide 77 above other system components, such that tether 22 does not interfere with storage structure 82, transfer jack 102, or retrieval ramp 18 as system 110 is transitioned between the receiving and retrieval configurations. Frame 74 of system 110 also positions and supports vision system 78, and frame 74 is configured to position vision system 78 such that a sufficient field of vision of the airstream outside aircraft 14 is viewable, in order to facilitate capture of UAV 12.

Figure 6:
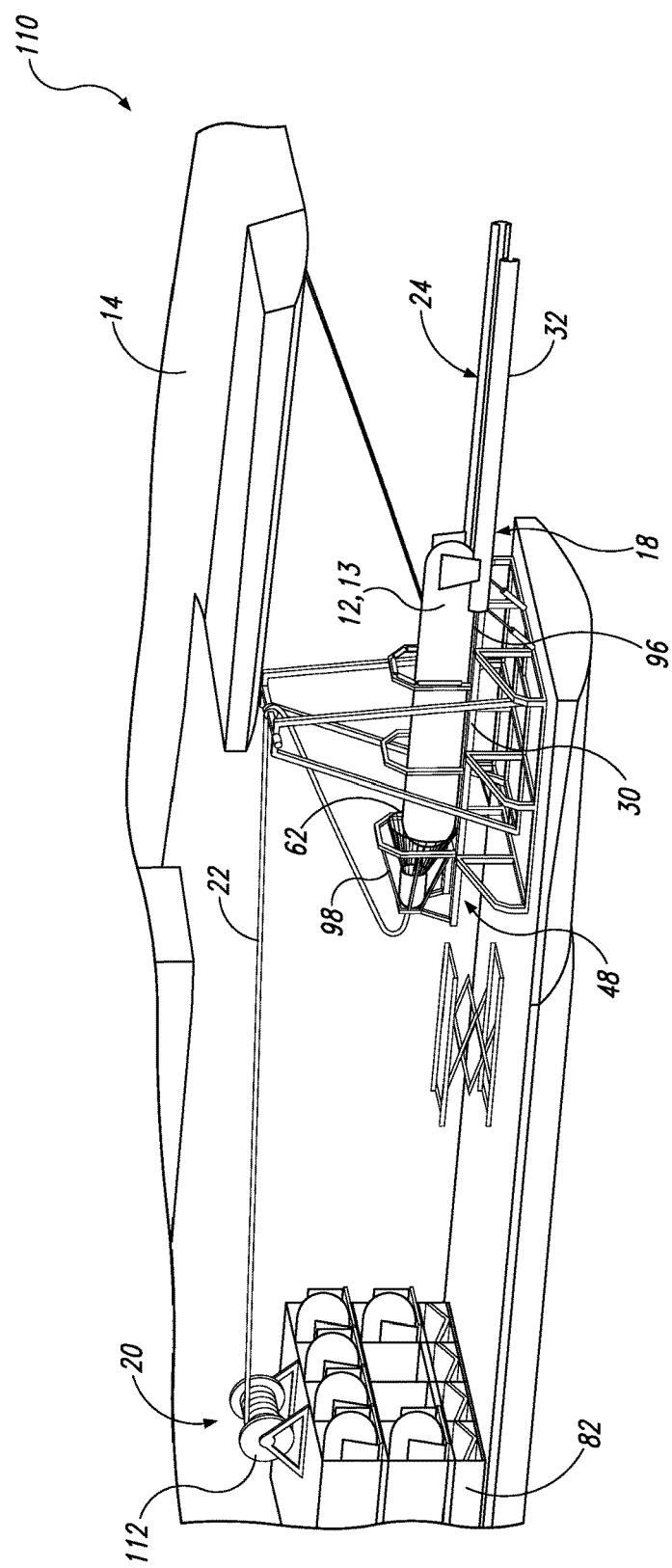
FIG. 6 is a perspective view of an example of a system according to the present disclosure, with the captured UAV positioned at least partially within the aircraft and a drogue-receiver of the tether system being in a transfer configuration.

Turning now to FIG. 6, system 110 has been further transitioned towards the receiving configuration, as compared to the configuration shown in FIG. 5. Compared to FIG. 5, retrieval ramp 18 has been further raised such that second ramp portion 32 is substantially parallel with first ramp portion 30. Additionally, tether system 20 in FIG. 6 has been further retracted towards the retracted configuration such that a greater proportion of tether 22 is stowed about reel 112, thereby causing captured UAV 13, restraint structure 48, and carriage 96 to be translated with respect to elongate surface 24 of retrieval ramp 18, until captured UAV 13 is positioned at least partially within aircraft 14. As shown in FIG. 6, in this configuration, restraint structure 48, carriage 96, and captured UAV 13 are partially positioned within frame 74.

Figure 7:
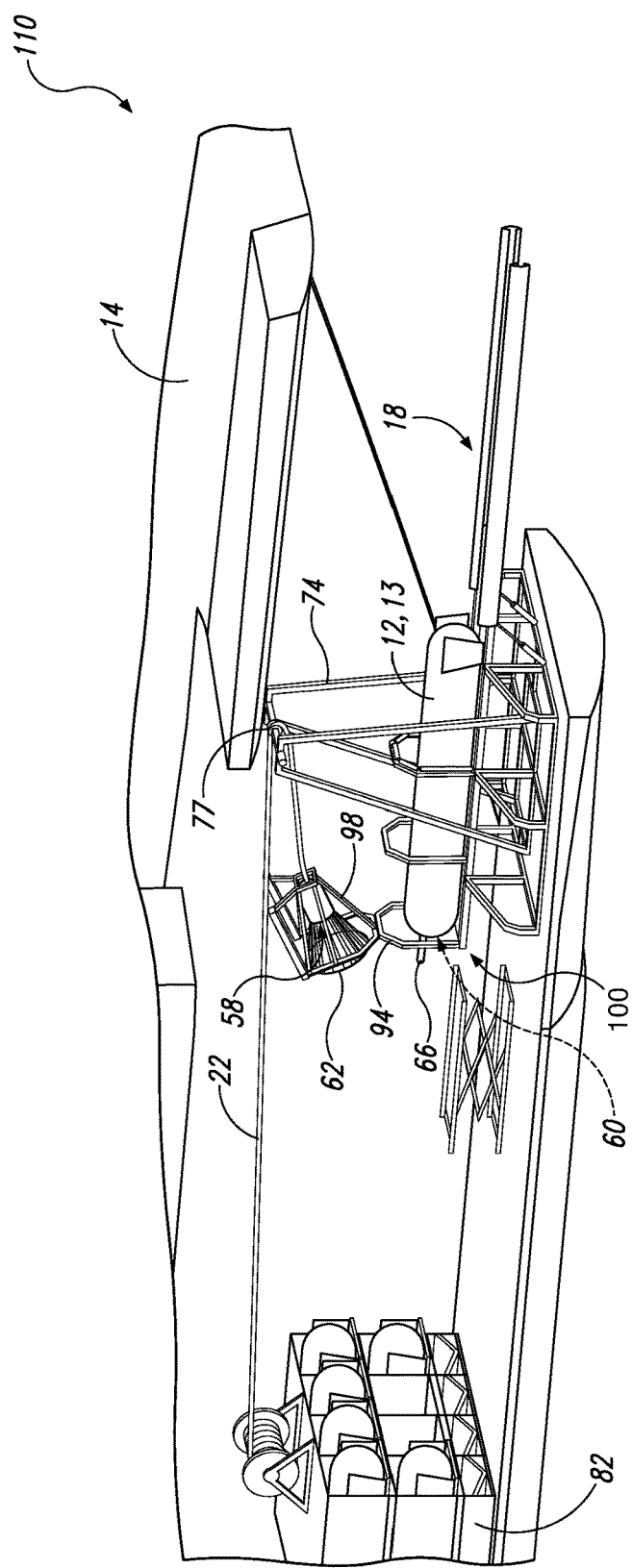
FIG. 7 is a perspective view of an example of a system according to the present disclosure, with the drogue-receiver of the tether system being in a delivery configuration.

Next, as shown in FIG. 7, drogue-receiver 98 is transitioned to the delivery configuration, wherein drogue-receiver 98 is rotated with respect to the rest of restraint structure 48, thereby allowing passage of captured UAV 13 through the respective spaced-apart arch 94 nearest fore end region 100 of restraint structure 48. In transitioning drogue-receiver 98 to the delivery configuration, UAV connector 60 of captured UAV 13 is disengaged from capture connector 58 within drogue 62, and probe 66 of captured UAV 13 is removed from drogue 62. Such movement of drogue-receiver 98 to the delivery configuration may be accomplished by further retracting tether 22, as guided by tether guide 77 on frame 74, thereby pulling drogue 62 and drogue-receiver 98 away from captured UAV 13. In other examples, a separate mechanism may be configured to move drogue-receiver 98 to the delivery configuration.

Figure 8:
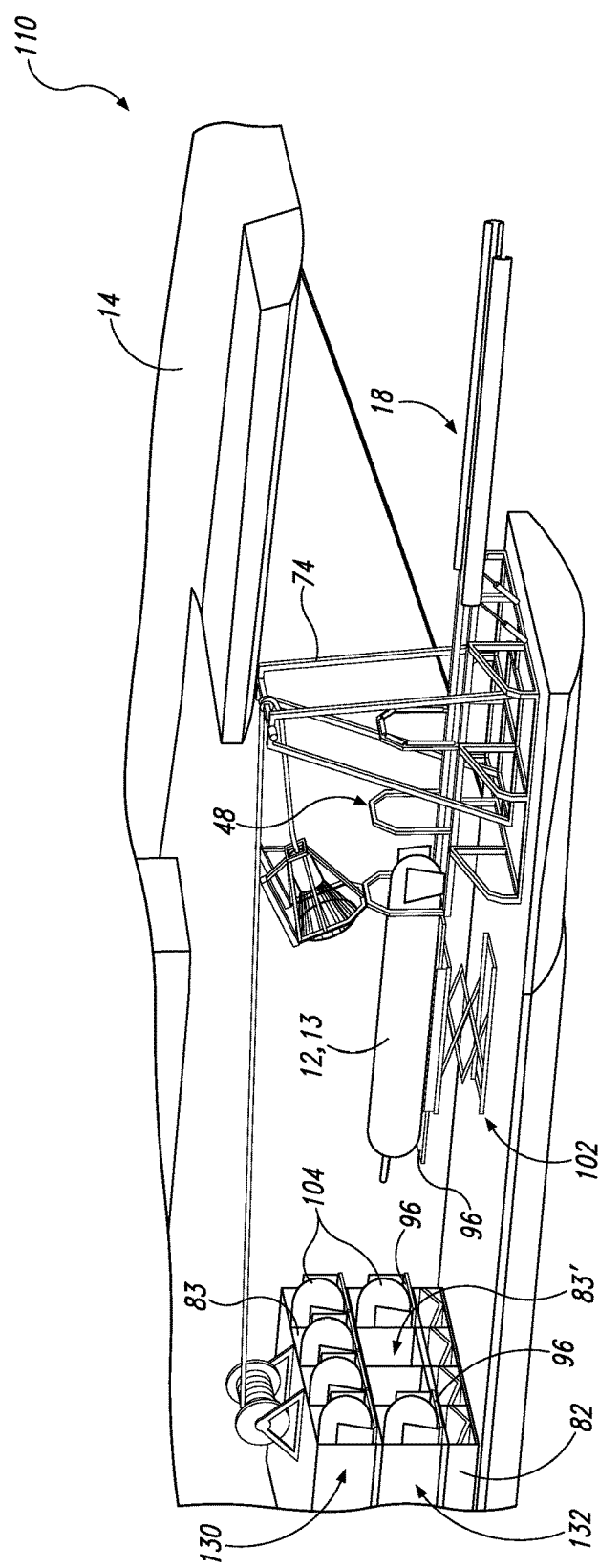
FIG. 8 is a perspective view of an example of a system according to the present disclosure, with a captured UAV being transferred to a storage structure in the aircraft.

FIG. 8 illustrates movement of captured UAV 13 and carriage 96 out of restraint structure 48 and off of retrieval ramp 18, onto transfer jack 102. Transfer jack 102 is configured to transfer captured UAV 13 into a respective vacant storage cell 83' of a plurality of storage cells 83 of storage structure 82. As shown in FIG. 8, storage structure 82 includes a plurality of stored UAVs 104 (which were previously captured by system 110), each respective stored UAV 104 having a respective carriage 96 and a respective storage cell 83 within storage structure 82. Storage structure 82 includes a top row 130 of storage cells 83, and a bottom row 132 of storage cells 83, though other examples may include more or fewer rows and/or cells. Transfer jack 102 is configured to translate in the X-Y direction to position captured UAV 13 with respect to vacant storage cell 83'. Additionally, transfer jack 102 is configured to raise and lower in the Z direction, such that it is configured to place the captured UAV 13 in any respective row (e.g., at varying heights) of storage structure 82.

Figure 9:
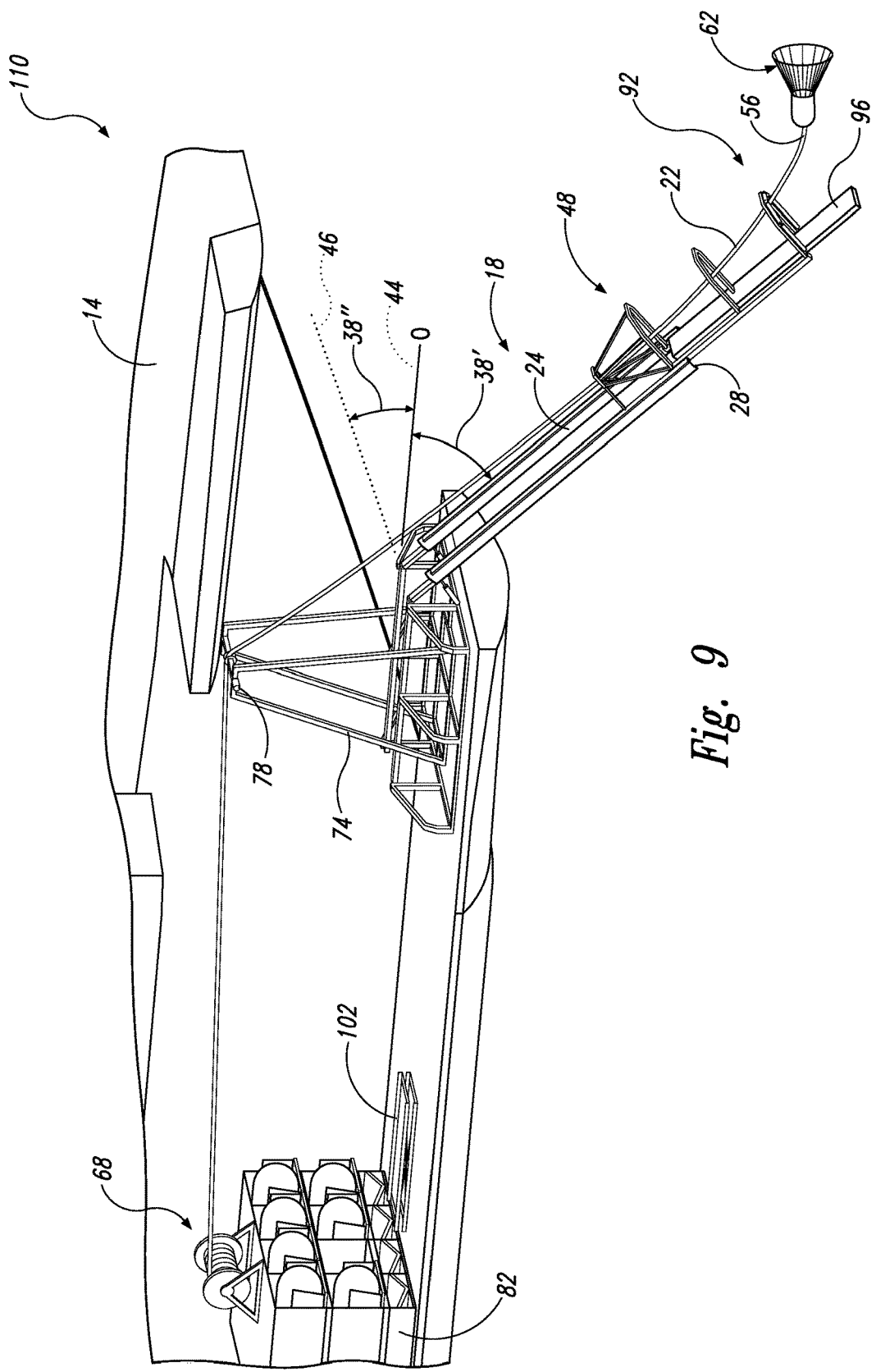
FIG. 9 is a perspective view of an example of a system according to the present disclosure, with the system being re-positioned in a retrieval configuration for capture of a second UAV.

FIG. 9 illustrates system 110 being once again transitioned towards the retrieval configuration, to retrieve another airborne UAV. As shown in FIG. 9, retrieval ramp 18 has been moved towards the extended configuration by lowering at least a portion of the ramp out of aircraft 14, restraint structure 48 and carriage 96 have been positioned at least partially beyond terminal end 28 of elongate surface 24 of retrieval ramp 18, and terminal tether end 56 of tether 22 and drogue 62 have been extended beyond aft end region 92 of restraint structure 48 in order to capture the next UAV. Feedback from vision system 78, other onboard sensors, and/or from sensors on airborne UAV 11 (FIG. 1) may be used by controller 16 (FIG. 1) to adjust the positions of retrieval ramp 18, terminal tether end 56, and/or restraint structure 48 in order to capture the airborne UAV.

Figure 10:
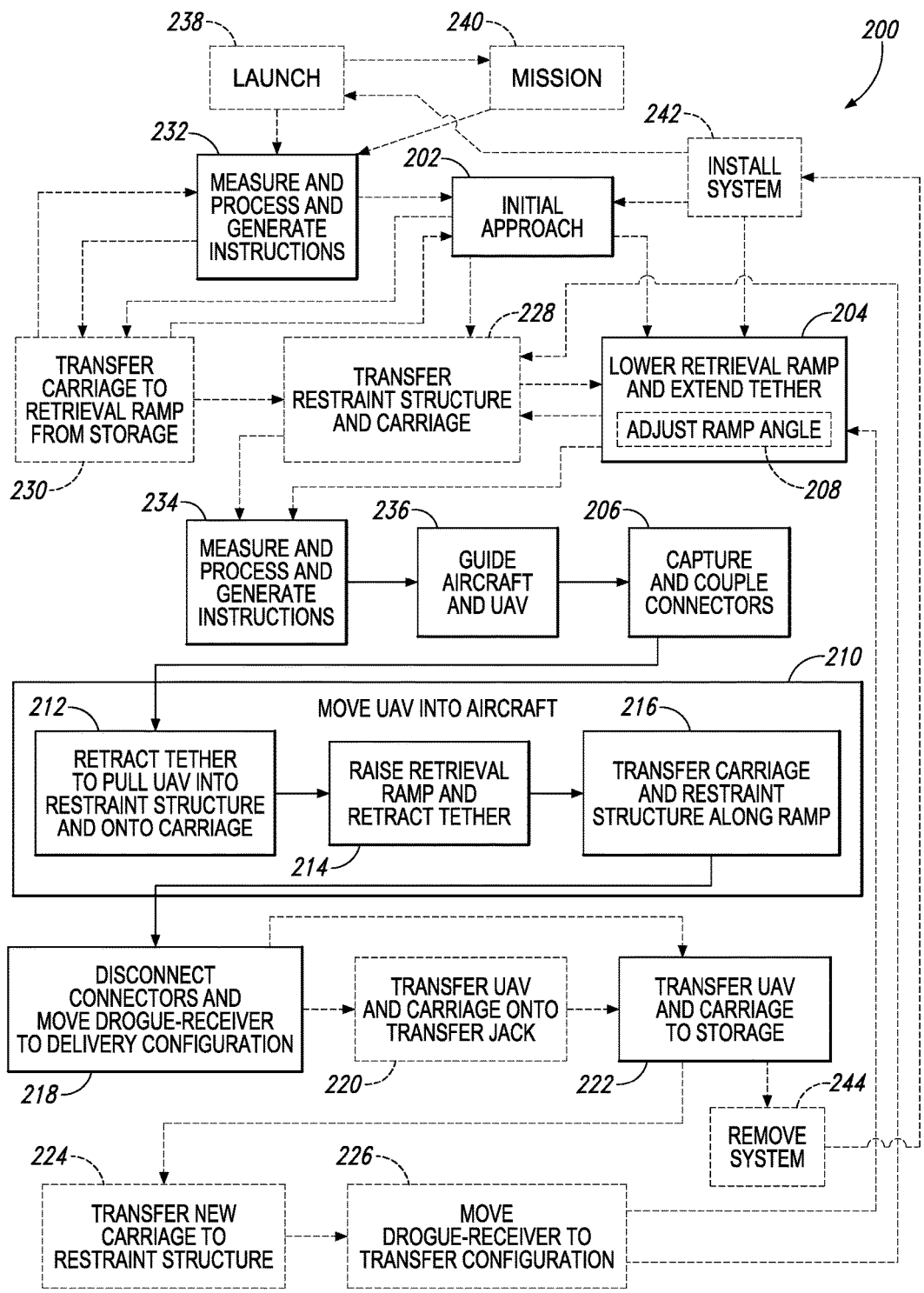
FIG. 10 is a schematic flow chart diagram, representing methods according to the present disclosure.

FIG. 10 schematically provides a flowchart that represents illustrative, non-exclusive examples of methods 200 for retrieving a UAV (e.g., UAV 12) into an aircraft (e.g., aircraft 14) while the UAV and aircraft are airborne, according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Methods 200 include approaching the UAV with the aircraft at 202, lowering a retrieval ramp (e.g., retrieval ramp 18) from the aircraft towards an extended configuration at 204, and capturing the UAV by engaging a capture connector (e.g., capture connector 58) with a UAV connector (e.g., UAV connector 60) coupled to the UAV at 206. Lowering the retrieval ramp at 204 includes extending a tether (e.g., tether 22) towards a capture configuration and optionally may include adjusting a ramp angle between portions of the retrieval ramp at 208 (e.g., ramp angle 38 between first ramp portion 30 and second ramp portion 32 of retrieval ramp 18). Lowering the retrieval ramp at 204 may include opening a cargo bay door of the aircraft (e.g., aircraft door 84) in order to allow the retrieval ramp and tether to be moved (e.g., lowered) into the airstream behind the aircraft. Extending the tether at 204 may include extending the tether until the capture connector at the terminal tether end of the tether is positioned beyond an area of turbulence (e.g., area of turbulence 50) generated by the aircraft, such that the capture connector may be engaged with the UAV connector of the airborne UAV (e.g., airborne UAV 11) outside the area of turbulence. Extending the tether at 204 may be performed using a tether extension mechanism (e.g., tether extension mechanism 68), such as by reeling out the tether from about a reel or other device.

Once the airborne UAV is captured at 206, methods 200 include moving the captured UAV (e.g., captured UAV 13) into the aircraft via the tether and retrieval ramp at 210. Moving the captured UAV into the aircraft generally includes retracting the tether to pull the captured UAV into a restraint structure (e.g., restraint structure 48) and onto a carriage (e.g., carriage 96) at 212, raising the retrieval ramp from the extended configuration towards a stowed configuration and retracting the tether towards a retracted configuration at 214, and transferring the carriage and restraint structure along the retrieval ramp towards the aircraft at 216. Retracting the tether to pull the captured UAV into the restraint structure at 212 may include securing the captured UAV in six degrees of freedom within the restraint structure, such that the restraint structure is configured to prevent rotation and/or lateral movement of the captured UAV with respect to the retrieval ramp as the captured UAV is being transferred to the aircraft (e.g., as the captured UAV is moved longitudinally along the retrieval ramp, towards the aircraft). In some methods 200, raising the retrieval ramp and retracting the tether at 214 also may include closing the cargo bay door of the aircraft, to contain the system within the aircraft. For example, once all desired airborne UAVs have been captured, the aircraft door may be closed and the system may be placed in a stowed configuration while not in active use.

Once the captured UAV has been loaded within the aircraft, the UAV connector and capture connectors are disengaged from one another at 218, and a drogue-receiver (e.g., drogue-receiver 98) may be moved from a transfer configuration to a delivery configuration to allow transfer of the captured UAV out of the restraint structure and into the aircraft. For example, the captured UAV and carriage may be transferred onto a transfer jack (e.g., transfer jack 102) at 220 and/or the captured UAV and carriage may be transferred to a storage structure (e.g., storage structure 82) within the aircraft at 222, such as via the transfer jack, via personnel onboard the aircraft, and/or via another device.

Once the captured UAV has been stored within the aircraft, the system may be redeployed to capture another respective airborne UAV (e.g., airborne UAV 11'). In some methods 200, redeploying the system includes transferring a second respective carriage (e.g., a carriage stored in the storage structure in a vacant storage cell) to the restraint structure at 224, moving the drogue-receiver back to the transfer configuration at 226 (e.g., by rotating the drogue-receiver with respect to the restraint structure), and again lowering the retrieval ramp and extending the tether at 204. Then a second airborne UAV may be captured at 206 by engaging the capture connector with the respective UAV connector of the second airborne UAV. The other method steps regarding measuring and positioning the system components, and transferring the second captured UAV into the aircraft may be performed again, and so on, until all desired airborne UAVs have been retrieved by the aircraft and systems according to the present disclosure.

In some methods 200, the restraint structure and carriage may be transferred (e.g., moved) with respect to the retrieval ramp at 228 in order to capture a UAV. Such movement of the restraint structure and carriage may be performed before, after, or contemporaneously with the lowering of the retrieval ramp and extending the tether at 204. Translating the restraint structure and carriage along the retrieval ramp at 228 may be performed until the restraint structure and carriage are positioned adjacent a terminal end of the retrieval ramp (e.g., terminal end 28). Additionally or alternatively, translating the restraint structure and carriage with respect to the retrieval ramp at 228 may be performed using a restraint transport mechanism (e.g., restraint transport mechanism 52). In some methods, an initial carriage is transferred from the storage structure to the retrieval ramp at 230 before lowering the retrieval ramp at 204, such as for capture of the first respective UAV in a given flight.

Methods 200 include measuring relative positions and velocities of the aircraft and the UAV, which may be performed before the initial approach at 202, at 232, and/or after the initial approach at 202 and the lowering the retrieval ramp at 204, at 234. Measuring relative positions and velocities at 232 and 234 may also include processing such data and generating instructions for guiding and positioning the aircraft and UAV at 236, based on the measured relative positions and velocities. Measuring relative positions and velocities of the aircraft and UAV at 232 and 234 may include measuring said positions and velocities with one or more sensors positioned on the aircraft and UAV. In some methods 200, guiding and positioning the aircraft and UAV at 236 may include compensating for turbulence adjacent to and generated by the aircraft. In some methods 200, measuring relative positions and velocities at 232 may be performed using a first sensor, and measuring relative positions and velocities at 234 may be performed using a second sensor. In some methods, measuring the relative positions and velocities at 232 and/or 234 may include measuring the relative positions and velocities of the capture connector and the UAV connector of the UAV being captured.

In some methods 200, one or more UAVs may be launched from the aircraft at 238 and/or the airborne UAV may perform one or more missions at 240 prior to being captured by the aircraft at 206. Launching one or more UAVs from the aircraft at 238 may include refueling, recharging, and/or reconfiguring the UAV before launch. Launching the UAV at 238 may be performed from a ground location, from a vessel positioned within a body of water, or may be performed from the aircraft while airborne.

In some methods 200, the system may be installed in an aircraft at 242 prior to capturing one or more UAVs. Similarly, the system may be removed from the aircraft at 244, such as after capturing one or more UAVs. For example, systems according to the present disclosure may be configured to be palletized, such that they may be easily installed at 242 and/or removed at 244, such that a given system may be used in a variety of different aircraft. One or more steps of methods 200 may be automated, and/or one or more steps of methods 200 may be performed by an operator, who may be located on the aircraft, or may be located remotely from the aircraft.

Illustrative, non-exclusive examples of inventive subject matter according to the present disclosure are described in the following enumerated paragraphs:

A1. A retrieval ramp configured to transfer a UAV to and/or from an aircraft while the UAV and the aircraft are airborne, wherein the retrieval ramp comprises an elongate surface, wherein the retrieval ramp is configured to be selectively and reversibly moved between a stowed configuration in which the retrieval ramp is contained within the aircraft, and an extended configuration, in which at least a portion of the retrieval ramp is positioned outside of the aircraft.

A1.1. The retrieval ramp of paragraph A1, wherein the retrieval ramp is configured to capture the UAV and load the UAV into the aircraft while the aircraft is airborne.

A1.2. The retrieval ramp of paragraph A1 or A1.1 wherein the retrieval ramp is configured to deliver the UAV from the aircraft and release the UAV while the aircraft is airborne.

A1.3. The retrieval ramp of any of paragraphs A1-A2, wherein the elongate surface of the retrieval ramp extends from a first end of the retrieval ramp to a terminal end of the retrieval ramp.

A1.4. The retrieval ramp of paragraph A1.3, wherein the elongate surface of the retrieval ramp comprises:

a first ramp portion positioned at least partially within the aircraft, the first ramp portion extending from the first end of the retrieval ramp to a second end of the first ramp portion; and a second ramp portion extending from a proximal end of the second ramp portion to the terminal end of the retrieval ramp, wherein the second ramp portion is coupled to the first ramp portion adjacent the proximal end of the second ramp portion and the second end of the first ramp portion.

A1.5. The retrieval ramp of any of paragraphs A1-A1.4, further comprising a frame positioned within the aircraft.

A1.6. The retrieval ramp of paragraph A1.5, wherein the retrieval ramp is coupled to the frame.

A1.7. The retrieval ramp of paragraph A1.5 or A1.6, wherein a/the first ramp portion of the retrieval ramp is coupled to the frame.

A1.8. The retrieval ramp of any of paragraphs A1-A1.7, wherein, in the extended configuration, a/the terminal end of the retrieval ramp is positioned outside of the aircraft.

A1.9. The retrieval ramp of any of paragraphs A1-A1.8, wherein the aircraft is generating turbulence in an airstream.

A1.10. The retrieval ramp of any of paragraphs A1-A1.9, wherein, in the extended configuration, a/the terminal end of the retrieval ramp is positioned outside of turbulence generated by the aircraft.

A2. The retrieval ramp of any of paragraphs A1-A1.10, wherein a/the second ramp portion and a/the first ramp portion are hinged with respect to one another, such that a ramp angle formed between the first ramp portion and the second ramp portion is adjustable.

A3. The retrieval ramp of any of paragraphs A1-A2, wherein a/the second ramp portion and a/the first ramp portion are rotationally disposed with respect to one another, such that a/the ramp angle formed between the first ramp portion and the second ramp portion is adjustable, and such that the second ramp portion may be rotated with respect to the first ramp portion.

A4. The retrieval ramp of any of paragraphs A1-A3, wherein the retrieval ramp comprises a ramp adjustment mechanism configured to adjust a/the ramp angle between a/the first ramp portion and a/the second ramp portion.

A5. The retrieval ramp of any of paragraphs A1-A4, wherein the retrieval ramp comprises a/the ramp adjustment mechanism configured to rotate a/the second ramp portion with respect to a/the first ramp portion.

A6. The retrieval ramp of any of paragraphs A1-A5, wherein at least a portion of the retrieval ramp is telescoping.

A7. The retrieval ramp of any of paragraphs A-A6, wherein a/the ramp adjustment mechanism is configured to allow at least a 45 degree range of rotation, at least a 60 degree range of rotation, at least a 90 degree range of rotation, at least a 120 degree range of rotation, at least a 150 degree range of rotation, and/or at least a 180 degree range of rotation of a/the second ramp portion with respect to a/the first ramp portion.

A8. The retrieval ramp of any of paragraphs A1-A7, wherein a/the ramp adjustment mechanism is configured to selectively and reversibly move a/the second ramp portion with respect to a/the first ramp portion such that at least a portion of the second ramp portion is positioned outside of the aircraft in the extended configuration.

A9. The retrieval ramp of any of paragraphs A1-A8, wherein, in the stowed configuration, a/the ramp angle between a/the second ramp portion and a/the first ramp portion is a positive angle, wherein, in the extended configuration, the ramp angle between the second ramp portion and the first ramp portion is a negative angle, and wherein the ramp angle is defined as 0 degrees when the second ramp portion and the first ramp portion are parallel.

A10. The retrieval ramp of any of paragraphs A1-A9, wherein a/the ramp adjustment mechanism is configured to position a/the second ramp portion such that it is substantially parallel with a/the first ramp portion.

A11. The retrieval ramp of any of paragraphs A1-A10, wherein a/the ramp adjustment mechanism is configured to extend a/the second ramp portion out of a cargo bay of the aircraft.

A12. The retrieval ramp of any of paragraphs A1-A11, wherein a/the ramp adjustment mechanism is configured to extend at least a portion of the retrieval ramp into an airstream behind the aircraft.

A13. The retrieval ramp of any of paragraphs A1-A12, wherein a/the ramp adjustment mechanism is configured to position the retrieval ramp back into the aircraft after positioning at least a portion of the retrieval ramp outside of the aircraft.

A14. The retrieval ramp of any of paragraphs A1-A13, wherein at least a portion of the retrieval ramp is mounted in a/the cargo bay of the aircraft.

A15. The retrieval ramp of any of paragraphs A1-A14, wherein a/the first ramp portion is mounted in a/the cargo bay of the aircraft.

A16. The retrieval ramp of any of paragraphs A1-A15, further comprising a restraint structure configured to at least partially secure the UAV with respect to the elongate surface of the retrieval ramp.

A16.1. The retrieval ramp of paragraph A16, wherein the restraint structure is configured to at least partially secure the UAV with respect to a/the second ramp portion of the retrieval ramp.

A17. The retrieval ramp of paragraph A16 or A16.1, wherein the restraint structure is configured to be selectively and reversibly moved with respect to the elongate surface of the retrieval ramp.

A17.1. The retrieval ramp of any of paragraphs A16-A17, wherein the restraint structure is configured to be selectively and reversibly moved with respect to a/the first ramp portion and a/the second ramp portion of the retrieval ramp.

A18. The retrieval ramp of any of paragraphs A16-A17.1, wherein the restraint structure is configured to move fore and aft with respect to a/the first ramp portion and/or with respect to a/the second ramp portion.

A18.1. The retrieval ramp of any of paragraphs A16-A18, wherein the restraint structure is configured to move fore and aft with respect to the elongate surface of the retrieval ramp.

A19. The retrieval ramp of any of paragraphs A16-A18.1, wherein the restraint structure is configured to selectively slide from a/the first ramp portion to a/the second ramp portion, and vice versa.

A20. The retrieval ramp of any of paragraphs A16-A19, wherein, in the extended configuration, at least a portion of the restraint structure extends past the elongate surface of the retrieval ramp.

A20.1. The retrieval ramp of any of paragraphs A16-A20, wherein, in the extended configuration, at least a portion of the restraint structure extends past a/the terminal end of the retrieval ramp.

A21. The retrieval ramp of any of paragraphs A16-A20.1, wherein the restraint structure is configured to at least partially restrain the UAV once the UAV is secured within the restraint structure, while the UAV is being moved into or out of the aircraft.

A21.1. The retrieval ramp of any of paragraphs A16-A21, wherein the restraint structure is configured to at least partially restrain the UAV while the UAV and the restraint structure are moved through turbulence generated by the aircraft.

A22. The retrieval ramp of any of paragraphs A16-A21.1, wherein the restraint structure is configured to prevent lateral movement of the UAV with respect to the elongate surface of the retrieval ramp, while the UAV is secured within the restraint structure.

A22.1. The retrieval ramp of any of paragraphs A16-A22, wherein the restraint structure is configured to prevent lateral movement of the UAV with respect to a/the first ramp portion and/or a/the second ramp portion.

A23. The retrieval ramp of any of paragraphs A16-A22.1, wherein the restraint structure is configured to at least partially enclose the UAV, while the UAV is being moved into or out of the aircraft.

A24. The retrieval ramp of any of paragraphs A16-A23, wherein the restraint structure is configured to secure the UAV in at least 1 degree of freedom, at least 2 degrees of freedom, at least 3 degrees of freedom, at least 4 degrees of freedom, at least 5 degrees of freedom, and/or at least 6 degrees of freedom.

A25. The retrieval ramp of any of paragraphs A16-A24, further comprising a restraint transport mechanism configured to move the restraint structure with respect to the aircraft.

A26. The retrieval ramp of paragraph A25, wherein the restraint transport mechanism is configured to move the restraint structure with respect to the elongate surface of the retrieval ramp.

A26.1. The retrieval ramp of paragraph A25, wherein the restraint transport mechanism is configured to move the restraint structure with respect to a/the first ramp portion and/or a/the second ramp portion.

A27. The retrieval ramp of any of paragraphs A1-A26.1, wherein the retrieval ramp is configured such that, in the extended configuration, a/the terminal end of the retrieval ramp is positioned beyond an area of turbulent air adjacent the aircraft.

A28. The retrieval ramp of any of paragraphs A1-A27, wherein the retrieval ramp is configured to be deployed to a plurality of different heights and distances relative to the aircraft.

A29. The retrieval ramp of any of paragraphs A1-A28, wherein a/the frame is positioned within a/the cargo bay of the aircraft.

A30. The retrieval ramp of any of paragraphs A1-A29, wherein a/the frame is positioned adjacent an aircraft door that provides access to a/the cargo bay of the aircraft.

A31. The retrieval ramp of any of paragraphs A1-A30, wherein a/the frame is coupled to the aircraft.

A32. The retrieval ramp of any of paragraphs A1-A32, wherein a/the frame is selectively and reversibly removable from the aircraft.

A33. The retrieval ramp of any of paragraphs A1-A32, wherein a/the frame is configured to support a/the first ramp portion.

A34. The retrieval ramp of any of paragraphs A1-A33, wherein a/the frame is configured to support a/the ramp adjustment mechanism.

A35. The retrieval ramp of any of paragraphs A1-A34, wherein a/the frame is configured to guide and position a tether that extends from within a/the cargo bay of the aircraft to beyond a/the terminal end of the retrieval ramp, wherein the tether is configured to be coupled to the UAV for transfer of the UAV into and/or out of the aircraft.

A35.1. The retrieval ramp of any of paragraphs A1-A35, wherein a/the frame is configured to guide and position a tether that extends from within a/the cargo bay of the aircraft to beyond the elongate surface of the retrieval ramp, wherein the tether is configured to be coupled to the UAV for transfer of the UAV into and/or out of the aircraft.

A35.2. The retrieval ramp of paragraph A35 or A35.1, wherein the tether is configured to capture the UAV while the UAV is airborne.

A36. The retrieval ramp of any of paragraphs A1-A35.2, wherein a/the frame is configured to mount a vision system such that the vision system has a sufficient field of regard to facilitate capture of the UAV.

A37. The retrieval ramp of any of paragraphs A1-A36, wherein a/the frame is installed in the aircraft non-permanently.

A38. The retrieval ramp of any of paragraphs A1-A37, wherein a/the frame is configured to slide in and out of the aircraft.

A39. The retrieval ramp of any of paragraphs A1-A38, wherein a/the frame is adapted for multiple different types of aircraft.

A40. The retrieval ramp of any of paragraphs A1-A39, wherein a/the restraint structure comprises one or more friction-reducing structures configured to reduce friction between the UAV and at least a portion of the restraint structure as the UAV is positioned within the restraint structure.

A41. The retrieval ramp of paragraph A40, wherein the one or more friction-reducing structures comprise one or more rollers, wherein each roller is configured to rotate about its respective longitudinal axis.

A42. The retrieval ramp of paragraph A41, wherein the one or more rollers are configured to rotate when contacted by the UAV as the UAV is pulled into the restraint structure and the UAV is moved with respect to the one or more rollers, thereby reducing friction between the UAV and the restraint structure.

A43. The retrieval ramp of any of paragraphs A40-A42, wherein the one or more friction-reducing structures are configured to guide the UAV into and/or out of the restraint structure.

A44. The retrieval ramp of any of paragraphs A40-A43, wherein the one or more friction-reducing structures are positioned within an aft end region of the restraint structure.

A45. The retrieval ramp of any of paragraphs A1-A44, wherein a/the restraint structure comprises a plurality of spaced-apart arches that are configured to receive the UAV.

A46. The retrieval ramp of paragraph A45 and of any of paragraphs A40-A44, wherein the one or more friction-reducing structures are positioned on one or more respective arches of a/the plurality of arches.

A47. The retrieval ramp of any of paragraphs A1-A46, wherein a/the restraint structure is configured to accommodate a fixed-wing UAV.

A48. The retrieval ramp of any of paragraphs A1-A47, wherein a/the restraint structure is configured to accommodate a foldable-wing UAV.

A49. The retrieval ramp of any of paragraphs A1-A48, wherein a/the restraint structure comprises a drogue-receiver adjacent a fore end region of the restraint structure.

A50. The retrieval ramp of paragraph A49, wherein the drogue-receiver is configured to engage a drogue configured for UAV-capture.

A51. The retrieval ramp of any of paragraphs A49-A50, wherein the drogue-receiver is coupled to a respective arch of a/the plurality of arches of the restraint structure.

A52. The retrieval ramp of any of paragraphs A49-A50, wherein the drogue-receiver is integrally formed with a respective arch of a/the plurality of arches of the restraint structure.

A53. The retrieval ramp of any of paragraphs A49-A52, wherein the drogue-receiver is basket-like.

A54. The retrieval ramp of any of paragraphs A49-A53, wherein the drogue-receiver is substantially conical.

A55. The retrieval ramp of any of paragraphs A49-A54, wherein the drogue-receiver includes an opening through which a/the tether passes.

A56. The retrieval ramp of paragraph A55, wherein the opening is configured to prevent passage of the UAV and the drogue there through.

A57. The retrieval ramp of any of paragraphs A49-A56, wherein the drogue-receiver is configured to be selectively and reversibly moved between a transfer configuration, in which the drogue-receiver is configured to prevent the UAV from being pulled off the fore end of the restraint structure as the UAV is transferred into the aircraft, to a delivery configuration, in which the drogue-receiver is positioned such that the UAV may be transferred from the restraint structure to the aircraft, passing by the fore end region of the restraint structure.

A58. The retrieval ramp of any of paragraphs A49-A57, wherein the drogue-receiver is configured to rotate with respect to the restraint structure such that the captured UAV may be removed from the restraint structure and transferred to the aircraft.

B1. A tether system configured to be used with the retrieval ramp of any of paragraphs A1-A58, the tether system comprising:

a tether extending from an initial tether end to a terminal tether end, the tether having a length sufficient for retrieving the UAV from an/the airstream outside the aircraft and/or for releasing the UAV into the airstream; and a capture connector disposed at the terminal tether end of the tether, wherein the capture connector is configured to engage the UAV.

B1.1. The tether system of paragraph B1, further comprising:

a drogue coupled to the terminal tether end of the tether, the drogue being configured to receive at least a portion of the UAV.

B1.2. The tether system of paragraph B1 or B1.1, wherein the capture connector is configured to selectively engage a UAV connector of the UAV.

B1.3. The tether system of any of paragraphs B1-B1.2, wherein the capture connector is configured to be positioned such that it engages the UAV outside of turbulence generated by the aircraft, thereby capturing the UAV.

B1.4. The tether system of any of paragraphs B1-B1.3, wherein the capture connector is configured to be positioned such that it disengages from the UAV outside of turbulence generated by the aircraft, thereby releasing the UAV.

B1.5. The tether system of any of paragraphs B1-B1.4, wherein the tether system is configured to be used with the retrieval ramp to capture the UAV and load the UAV into the aircraft while the aircraft is airborne.

B1.6. The tether system of any of paragraphs B1-B1.5, wherein the tether system is configured to be used with the retrieval ramp to transfer the UAV out of the aircraft and release the UAV while the aircraft is airborne.

B2. The tether system of any of paragraphs B1-B1.5, wherein the tether comprises an elongate, flexible cable.

B3. The tether system of any of paragraphs B1-B2, wherein a/the drogue is funnel-shaped.

B4. The tether system of any of paragraphs B1-B3, wherein a probe of the UAV is configured to be inserted into a/the drogue as the UAV is transferred into and/or out of the aircraft.

B5. The tether system of any of paragraphs B1-B4, wherein the tether system is selectively and reversibly moveable between a retracted configuration in which the terminal tether end is positioned inside the aircraft, and a capture configuration wherein the terminal tether end is positioned outside the aircraft.

B6. The tether system of any of paragraphs B5, wherein the tether is positioned such that it is disposed through a/the restraint structure of the retrieval ramp in the capture configuration.

B7. The tether system of any of paragraphs B1-B6, wherein a/the drogue comprises a/the capture connector configured to engage with a UAV connector positioned on the UAV to be coupled to the UAV.

B7.1. The tether system of paragraph B7, wherein the capture connector is disposed within the drogue.

B8. The tether system of any of paragraphs B1-B7.1, further comprising a tether extension mechanism configured to selectively and reversibly extend the tether towards a/the capture configuration and retract the tether towards a/the retracted configuration.

B9. The tether system of paragraph B8, wherein the tether extension mechanism comprises a spool, a reel, a winch, a pulley, and/or a retractable cord reel.

B10. The tether system of any of paragraphs B1-B9, wherein the tether comprises a stowed portion and an extended portion.

B11. The tether system of paragraph B10, wherein a first length of the stowed portion of the tether is greater in a/the retracted configuration than a second length of the stowed portion of the tether in a/the capture configuration.

B12. The tether system of paragraph B10 or B11, wherein a first length of the extended portion of the tether is greater in a/the capture configuration than a second length of the extended portion of the tether in a/the retracted configuration.

B13. The tether system of any of paragraphs B10-B12, wherein the stowed portion of the tether is stored within a/the tether extension mechanism.

B13.1. The tether system of any of paragraphs B10-B13, wherein the stowed portion of the tether is stored within a/the cargo bay of the aircraft.

B14. The tether system of any of paragraphs B10-B13.1, wherein the stowed portion of the tether is wrapped around a/the reel, a/the spool, and/or a/the winch of a/the tether extension mechanism.

B15. The tether system of any of paragraphs B10-B14, wherein the extended portion of the tether extends from a/the reel, a/the spool, and/or a/the winch of a/the tether extension mechanism, towards the frame, and extends through a tether guide coupled to the frame.

B15.1. The tether system of any of paragraphs B10-B15, wherein at least a portion of the extended portion of the tether is positioned within a/the cargo bay of the aircraft, and at least a portion of the extended portion of the tether is positioned outside the aircraft.

B16. The tether system of any of paragraphs B1-B15.1, wherein the initial tether end of the tether is engaged with a/the spool, a/the reel, and/or a/the winch of a/the tether extension mechanism.

B17. The tether system of any of paragraphs B1-B16, wherein, in a/the capture configuration, the terminal tether end is positioned outside the aircraft, in an airstream outside of the aircraft.

B18. The tether system of any of paragraphs B1-B17, wherein, in a/the capture configuration, the terminal tether end of the tether and the capture connector are positioned beyond any turbulent air present adjacent the aircraft.

B18.1. The tether system of any of paragraphs B1-B18, wherein, in a/the capture configuration, the terminal tether end of the tether and the capture connector are positioned beyond a/the terminal end of the retrieval ramp.

B19. The tether system of any of paragraphs B1-B18.1, wherein the tether system is configured to draw a captured UAV with the capture connector, as the tether is retracted to a/the retracted configuration.

B20. The tether system of any of paragraphs B1-B19, wherein the tether system is configured to transfer the UAV out of the aircraft as the tether is extended to the capture configuration.

C1. A UAV, comprising:
 a UAV connector configured to engage with the capture connector of the tether system of any of paragraphs B1-B20; and
 a probe configured to send and receive wireless data regarding the position and velocity of the UAV and the aircraft.

C2. The UAV of paragraph C1, wherein the UAV is a fixed-wing UAV.

C3. The UAV of paragraph C1, wherein the UAV has one or more foldable wings.

C4. The UAV of any of paragraphs C1-C3, further comprising one or more sensors configured to facilitate retrieval of the UAV.

D1. A controller for capturing and/or releasing a UAV into or out of an aircraft, while the aircraft is airborne, the controller comprising:
 a first sensor configured to measure the relative position and velocity between the aircraft and the UAV;
 a first processor configured to process data from the first sensor to guide the aircraft and the UAV to a given relative position and velocity for retrieval; and
 a second sensor configured to measure the relative position and velocity between a/the UAV connector and a/the capture connector of the tether system.

D1.1. The controller of paragraph D1, further comprising:
 a second processor configured to process data from the second sensor to guide and engage the UAV connector and the capture connector with each other, thereby capturing the UAV.

D1.2 The controller of paragraph D1, wherein the first processor is configured to process data from the second sensor to guide and engage the UAV connector and the capture connector with each other, thereby capturing the UAV.

D2. The controller of any of paragraphs D1-D1.2, wherein the controller is configured to selectively position the retrieval ramp of any of paragraphs A1-A58 in the stowed configuration, the extended configuration, and any position or arrangement between the stowed configuration and the extended configuration.

D2.1. The controller of paragraph D2, wherein the controller is configured to position the retrieval ramp in response to measured relative positions and velocities of the aircraft and the UAV.

D3. The controller of any of paragraphs D1-D2.1, wherein the controller is configured to position the tether system of any of paragraphs B1-B20 in the retracted configuration, the capture configuration, and any position or arrangement between the retracted configuration and the capture configuration.

D3.1. The controller of paragraph D3, wherein the controller is configured to position the tether system in response to measured relative positions and velocities of the aircraft and the UAV.

D4. The controller of any of paragraphs D1-D3.1, wherein the controller is configured for autonomous or semi-autonomous retrieval and/or release of one or more airborne UAVs.

D5. The controller of any of paragraphs D1-D4, wherein the first sensor comprises a GPS system.

D6. The controller of any of paragraphs D1-D5, wherein the second sensor comprises a LIDAR system.

D7. The controller of any of paragraphs D1-D6, wherein the controller is configured to compensate for turbulence near the aircraft.

D8. The controller of any of paragraphs D1-D7, wherein the controller is configured to position a/the retrieval ramp, a/the tether system, a/the capture connector, and/or a/the drogue to avoid turbulence near the aircraft while the UAV is being coupled to a/the capture connector and secured within a/the restraint structure of the retrieval ramp.

D8.1. The controller of any of paragraphs D1-D8, wherein the controller is configured to position a/the retrieval ramp and a/the tether system such that a/the capture connector is positioned to avoid turbulence near the aircraft while the UAV is being coupled to the capture connector and secured within a/the restraint structure of the retrieval ramp.

D8.2. The controller of any of paragraphs D1-D8.1, wherein the controller is configured to position a/the retrieval ramp and a/the tether system such that a/the capture connector is positioned to avoid turbulence near the aircraft while the UAV is being released from a/the capture connector into an/the airstream outside the aircraft.

D9. The controller of any of paragraphs D1-D8.2, wherein the controller is configured to generate and execute instructions that, when executed, cause the first processor to generate navigation control signals for directing the UAV to a relative position and velocity based on sensor information from the first sensor.

D10. The controller of any of paragraphs D1-D9, wherein the controller is configured to generate and execute instructions that, when executed, cause the first processor and/or a/the second processor to generate navigation control signals for directing the UAV to a relative position and velocity based on sensor information from the second sensor so that the UAV connector and the capture connector are engaged with one another.

E1. An aircraft comprising the retrieval ramp of any of paragraphs A1-A58, the tether system of any of paragraphs B1-B20, the UAV of any of paragraphs C1-C4, and/or the controller of any of paragraphs D1-D10, wherein the aircraft is configured to capture and/or release a UAV while the aircraft is airborne.

E2. The aircraft of paragraph E1, wherein the aircraft is a carrier aircraft.

E3. The aircraft of paragraph E1, wherein the aircraft is a cargo aircraft.

E4. The aircraft of any of paragraphs E1-E3, further comprising one or more sensors configured to facilitate capture and/or release of the UAV.

F1. A system for capturing a UAV and loading the UAV into an aircraft while the aircraft is airborne, the system comprising:
 a retrieval ramp configured to be selectively and reversibly moved between a stowed configuration in which the retrieval ramp is contained within the aircraft, and an extended configuration, in which at least a portion of the retrieval ramp is positioned outside of the aircraft; and
 a tether system configured to be used with the retrieval ramp to capture the UAV and load the UAV into the aircraft while the aircraft is airborne.

F1.1. The system of paragraph F1, wherein the retrieval ramp is the retrieval ramp of any of paragraphs A1-A58.

F1.2. The system of paragraph F1 or F1.1, wherein the tether system is the tether system of any of paragraphs B1-B20.

F1.3. The system of any of paragraphs F1-F1.2, further comprising a controller.

F1.4. The system of paragraph F3, wherein the controller is the controller of any of paragraphs D1-D10.

F1.5. The system of any of paragraphs F1-F1.4, wherein, in the extended configuration, at least a portion of the retrieval ramp is positioned beyond an area of turbulent air adjacent the aircraft.

F1.6. The system of any of paragraphs F1-F1.5, wherein the tether system includes a tether that is extendible from near a/the terminal end of the retrieval ramp to a position within a/the airstream around the aircraft.

F1.7. The system of any of paragraphs F1-F1.6, further comprising a/the capture connector disposed at a/the terminal end of the retrieval ramp, wherein the capture connector is configured to engage a/the UAV connector of the UAV.

F1.8. The system of paragraph F1.7, wherein the system is configured to transfer the UAV into the aircraft as the tether is retracted towards the retracted configuration, once the UAV is engaged with the capture connector.

F1.9. The system of any of paragraphs F1-F1.8, wherein the system is configured to transfer the UAV out of the aircraft and release the UAV into an airstream outside of the aircraft while the aircraft is airborne.

F2. The system of any of paragraphs F1-F1.9, further comprising the aircraft.

F2.1. The system of any of paragraphs F1-F2, wherein the system is at least partially contained within the aircraft.

F2.2. The system of any of paragraphs F1-F2.1, wherein the system is configured to be installed such that it is at least partially positioned within the aircraft.

F3. The system of any of paragraphs F1-F2.2, further comprising the UAV.

F4. The system of paragraph F3, wherein the UAV comprises a plurality of UAVs.

F5. The system of any of paragraphs F1-F4, wherein the system is configured to capture a plurality of respective airborne UAVs.

F5.1. The system of any of paragraphs F1-F5, wherein the system is configured to release a plurality of respective stored UAVs by transferring each respective stored UAV out of the aircraft while the aircraft is airborne.

F6. The system of any of paragraphs F1-F5.1, wherein the system is configured for use in a plurality of different types and/or sizes of aircraft.

F7. The system of any of paragraphs F1-F6, wherein the system is selectively and reversibly removable from the aircraft.

F8. The system of any of paragraphs F1-F7, wherein the system is configured to slide into a cargo bay of the aircraft.

F9. The system of any of paragraphs F1-F8, wherein the system is configured to capture and/or release the UAV in a location where the UAV avoids turbulence generated by the aircraft while the UAV is being engaged with or disengaged from a/the capture connector.

F10. The system of any of paragraphs F1-F9, wherein the system is configured to position the terminal end of the retrieval ramp beyond turbulence generated by the aircraft while the UAV is being captured or released.

F11. The system of any of paragraphs F1-F10, wherein the system is configured to be selectively and reversibly moved from a receiving configuration in which the system is configured to load a previously captured UAV into the aircraft, to a retrieval configuration in which the system is configured to capture an airborne UAV from a position outside of the aircraft.

F12. The system of paragraph F11, wherein, in the receiving configuration, the tether system is at least partially retracted towards a/the retracted configuration, the retrieval ramp is at least partially moved towards a/the stowed configuration, and/or a/the drogue-receiver is at least partially moved towards the delivery configuration.

F13. The system of paragraph F11 or F12, wherein, in the receiving configuration, the system is configured to be contained within the aircraft, such that a cargo bay door may be closed.

F14. The system of any of paragraphs F11-F13, wherein, in the retrieval configuration, the tether system is at least partially extended towards a/the capture configuration, the retrieval ramp is at least partially moved towards a/the extended configuration, and/or a/the drogue-receiver is at least partially moved towards the transfer configuration.

F14.1. The system of any of paragraphs F11-F14, wherein, in the retrieval configuration, a/the tether of the tether system extends beyond a/the elongate surface of the retrieval ramp.

F15. The system of any of paragraphs F1-F14.1, further comprising a transfer jack configured to transfer a captured UAV from the retrieval ramp to a UAV storage structure contained within the aircraft.

F15.1. The system of paragraph F1-F15, wherein the transfer jack is configured to transfer a stored UAV from the UAV storage structure to the retrieval ramp.

F16. The system of paragraph F15 or F15.1, wherein the transfer jack is configured to selectively and reversibly raise and lower a respective UAV positioned on the transfer jack.

F17. The system of any of paragraphs F15-F16, wherein the transfer jack is configured to selectively and reversibly translate a respective UAV positioned on the transfer jack, such that the UAV is moved away from the retrieval ramp and towards the UAV storage structure, or vice versa.

F18. The system of any of paragraphs F15-F17, wherein the transfer jack is configured to deposit the captured UAV in the UAV storage structure.

F19. The system of any of paragraphs F1-F18, further comprising a/the UAV storage structure for receiving and storing one or more UAVs captured by the system.

F20. The system of paragraph F19, wherein the UAV storage structure comprises a plurality of storage cells.

F21. The system of paragraph F19 or F20, wherein the UAV storage structure is separated from the frame by a distance that is equal to or greater than the length of the captured UAV.

F22. The system of any of paragraphs F1-F21, wherein the system is configured to recharge, refuel, and/or reconfigure one or more captured UAVs captured by the system.

F23. The system of any of paragraphs F1-F22, wherein the system is configured to redeploy one or more UAVs captured by the system.

F24. The system of any of paragraphs F1-F23, further comprising a carriage that is configured to longitudinally slide with respect to the elongate surface of the retrieval ramp.

F25. The system of any of paragraphs F1-F24, further comprising a/the carriage that is configured to longitudinally slide with respect to a/the first ramp portion, a/the second ramp portion, and/or a/the restraint structure.

F26. The system of any of paragraphs F24-F25, wherein the retrieval ramp is configured such that as the restraint structure is moved with respect to the elongate surface of the retrieval ramp, the carriage is moved with respect to the elongate surface of the retrieval ramp as well.

F27. The system of any of paragraphs F24-F26, wherein the retrieval ramp is configured such that as the restraint structure is moved with respect to a/the first ramp portion and a/the second ramp portion, the carriage is moved with respect to the first ramp portion and the second ramp portion as well.

F28. The system of any of paragraphs F24-F27, wherein the carriage is configured such that at least a portion of the carriage is positioned to extend beyond the elongate surface of the retrieval ramp during capture of the UAV.

F29. The system of any of paragraphs F24-F28, wherein the carriage is configured such that at least a portion of the carriage is positioned to extend beyond an/the aft end region of the restraint structure during capture and/or release of the UAV.

F30. The system of any of paragraphs F24-F29, wherein the carriage is configured to provide support for a captured UAV as the captured UAV is being transported into the aircraft, such that the captured UAV is positioned between the carriage and the restraint structure during transfer.

F31. The system of any of paragraphs F24-F30, wherein the carriage is configured to move with the UAV as the UAV is pulled into and/or transferred out of the aircraft.

F32. The system of any of paragraphs F1-F31, further comprising a plurality of carriages, wherein each carriage is configured to be stored in a/the storage structure on the aircraft until use, wherein during use, the carriage is positioned on the retrieval ramp and moved along with a/the restraint structure with respect to the elongate surface of the retrieval ramp, to a position for capturing and/or releasing the next UAV.

F33. The system of paragraph F32, wherein the system comprises a respective carriage for each respective UAV the system is configured to capture and/or store.

F34. The system of any of paragraphs F1-F33, wherein the system is palletized.

G1. A method for capturing and loading a UAV into an aircraft while the aircraft is airborne, the method comprising:
approaching the UAV with the aircraft;
lowering a retrieval ramp from the aircraft towards an extended configuration;
extending a tether towards a capture configuration, the tether having a capture connector coupled to a terminal tether end of the tether, wherein, in the capture configuration, the capture connector is positioned such that it is configured to engage with a UAV connector coupled to the UAV;
capturing the UAV by engaging the capture connector with the UAV connector coupled to the UAV; and
moving the UAV into the aircraft via the tether and the retrieval ramp.

G1.1. The method of paragraph G1, further comprising moving the UAV into a restraint structure of the retrieval ramp, and wherein the moving the UAV into the aircraft comprises transferring the restraint structure and the UAV along the retrieval ramp and into the aircraft.

G1.2. The method of paragraph G1 or G1.1, further comprising:
measuring relative positions and velocities of the aircraft and the UAV; and
positioning the aircraft based on the measured relative positions and velocities.

G1.3. The method of any of paragraphs G1-G1.2, wherein the transferring the restraint structure and the UAV into the aircraft comprises:
raising the retrieval ramp from the extended configuration towards a stowed configuration; and
retracting the tether towards a retracted configuration.

G2. The method of any of paragraphs G1-G1.3, further comprising disengaging the capture connector from the UAV connector.

G3. The method of any of paragraphs G1-G2, further comprising moving a drogue-receiver of the restraint structure from a transfer configuration to a delivery configuration, wherein, in the transfer configuration, the drogue-receiver is configured to retain a drogue and the UAV within the restraint structure, and wherein, in the delivery configuration, the drogue-receiver is moved to allow passage of the drogue and the UAV through the restraint structure.

G4. The method of any of paragraphs G1-G3, further comprising transferring the UAV from the restraint structure onto a transfer jack located within the aircraft.

G5. The method of paragraph G4, wherein the transferring the UAV from the restraint structure comprises transferring a carriage along with the UAV, wherein the carriage is positioned such that it supports and underlies the UAV.

G6. The method of any of paragraphs G1-G5, further comprising moving the UAV to a storage structure within the aircraft.

G7. The method of paragraph G6, wherein the moving the UAV to the storage structure comprises transferring the UAV from a/the transfer jack to the storage structure.

G8. The method of paragraph G6 or G7, wherein the moving the UAV to the storage structure comprises transferring the UAV and a/the carriage to the storage structure.

G9. The method of any of paragraphs G1-G8, further comprising transferring a second carriage to a/the restraint structure.

G10. The method of paragraph G9, wherein the transferring the second carriage to the restraint structure comprises transferring the second carriage from a/the storage structure to the restraint structure.

G11. The method of paragraph G9 or G10, wherein the transferring the second carriage to the restraint structure comprises transferring the second carriage via a/the transfer jack.

G12. The method of any of paragraphs G1-G11, further comprising moving a/the drogue-receiver of a/the restraint structure from a/the delivery configuration to a/the transfer configuration.

G13. The method of paragraph G12, wherein the moving the drogue-receiver comprises rotating the drogue-receiver with respect to the restraint structure.

G14. The method of any of paragraphs G1-G13, further comprising:
re-lowering the retrieval ramp from the aircraft to the extended configuration;
re-extending the tether towards the capture configuration;
capturing a second UAV by engaging the capture connector with a second UAV connector coupled to the second UAV;
moving the second UAV into the restraint structure coupled to the retrieval ramp;
transferring the restraint structure and the second UAV along the retrieval ramp and into the aircraft;
raising the retrieval ramp from the extended configuration towards the stowed configuration; and
retracting the tether towards the retracted configuration.

G15. The method of any of paragraphs G1-G14, wherein the capturing the UAV comprises capturing a plurality of respective UAVs, one after another.

G16. The method of any of paragraphs G1-G15, further comprising refueling one or more UAVs on the aircraft.

G17. The method of any of paragraphs G1-G16, further comprising recharging one or more UAVs on the aircraft.

G18. The method of any of paragraphs G1-G17, further comprising reconfiguring one or more UAVs on the aircraft.

G19. The method of any of paragraphs G1-G18, further comprising launching a respective UAV from the aircraft.

G20. The method of any of paragraphs G1-G19, further comprising launching a respective UAV from a ground location.

G21. The method of any of paragraphs G1-G20, further comprising launching a respective UAV from a vessel positioned within a body of water.

G22. The method of any of paragraphs G1-G21, further comprising opening a cargo bay door of the aircraft.

G23. The method of any of paragraphs G1-G22, further comprising closing a cargo bay door of the aircraft.

G24. The method of any of paragraphs G1-G23, further comprising installing the system of any of paragraphs F1-F34 in the aircraft.

G25. The method of any of paragraphs G1-G24, further comprising removing the system of any of paragraphs F1-F34 from the aircraft.

G26. The method of any of paragraphs G1-G25, wherein the retracting the tether towards the retracted configuration comprises reeling, retracting, spooling, and/or coiling the tether around a reel, a winch, a spool, and/or a wheel.

G27. The method of any of paragraphs G1-G26, further comprising adjusting a ramp angle of the retrieval ramp using a ramp adjustment mechanism, based on the measured relative locations and velocities of the aircraft and the UAV.

G28. The method of any of paragraphs G1-G27, wherein the measuring the relative positions and velocities of the UAV and the aircraft comprises measuring with a first sensor, and wherein the positioning the aircraft comprises processing the measured relative positions and velocities using a first processor and generating instructions to position the aircraft and the retrieval ramp.

G29. The method of any of paragraphs G1-G28, further comprising translating a/the restraint structure and a/the carriage along the retrieval ramp, until the restraint structure and the carriage are positioned adjacent a/the terminal end of the retrieval ramp.

G30. The method of paragraph G29, wherein the translating the restraint structure and the carriage along the retrieval ramp comprises moving the restraint structure and the carriage using a restraint transport mechanism.

G31. The method of any of paragraphs G1-G30, wherein the retrieval ramp is the retrieval ramp of any of paragraphs A1-A58.

G32. The method of any of paragraphs G1-G31, wherein the lowering the retrieval ramp comprises lowering the retrieval ramp such that a/the terminal end of the retrieval ramp is positioned in an airstream behind the aircraft.

G33. The method of any of paragraphs G1-G32, wherein the extending the tether comprises extending the tether such that the capture connector is positioned beyond turbulence generated by the aircraft while the capture connector is being engaged with the UAV.

G34. The method of any of paragraphs G1-G33, wherein the capturing the UAV is performed in a location that avoids turbulence generated by the aircraft.

G35. The method of any of paragraphs G1-G34, wherein the positioning the aircraft based on the measured relative positions and velocities of the aircraft and the UAV comprises compensating for turbulence adjacent the aircraft.

G36. The method of any of paragraphs G1-G35, wherein the extending the tether and the retracting the tether are performed using a tether extension mechanism.

G37. The method of any of paragraphs G1-G36, wherein the capturing the UAV comprises securing the UAV in six degrees of freedom within a/the restraint structure.

G38. The method of any of paragraphs G1-G37, wherein one or more method steps are automated.

G39. The method of any of paragraphs G1-G38, wherein one or more method steps are performed by an operator on the aircraft.

G40. The method of any of paragraphs G1-G39, wherein the capturing the UAV by engaging the capture connector with the UAV connector coupled to the UAV comprises measuring relative positions of the capture connector and the UAV connector with a second sensor.

G41. The method of any of paragraphs G1-G40, wherein the positioning the aircraft comprises processing the measured relative positions using a/the first processor and generating navigation instructions to guide the aircraft and the UAV such that the capture connector and the UAV connector engage.

G42. The method of any of paragraphs G1-G40, wherein the positioning the aircraft comprises processing the measured relative positions using a second processor and generating navigation instructions to guide the aircraft and the UAV such that the capture connector and the UAV connector engage.

H1. Use of the aircraft of any of paragraphs E1-E4 to capture and load a UAV into the aircraft, while the aircraft is airborne.

I1. Use of the system of any of paragraphs F1-F34 to capture and load a UAV into an aircraft, while the aircraft is airborne.

J1. Use of the system of any of paragraphs F1-F32 to transfer a UAV out of an aircraft and release the UAV into an airstream outside the aircraft, while the aircraft is airborne.

K1. Use of the aircraft of any of paragraphs E1-E4 to transfer a UAV out of the aircraft and release the UAV into an airstream outside of the aircraft, while the aircraft is airborne.

L1. A method for transferring a UAV out of an aircraft while the aircraft is airborne and releasing the UAV into an airstream outside of the aircraft, the method comprising:

lowering a retrieval ramp from the aircraft towards an extended configuration;

extending a tether towards a capture configuration, the tether having a capture connector coupled to a terminal tether end of the tether, wherein, in the capture configuration, the capture connector is positioned such that it is configured to engage with a UAV connector coupled to the UAV;

moving the UAV out of the aircraft via the tether and the retrieval ramp; and releasing the UAV by disengaging the capture connector from the UAV connector coupled to the UAV.

L2. The method of paragraph L1, further comprising moving the UAV into a restraint structure of the retrieval ramp, and wherein the moving the UAV into the aircraft comprises transferring the restraint structure and the UAV along the retrieval ramp and out of the aircraft.

L3. The method of any of paragraphs L1-L2, further comprising transferring the UAV to the restraint structure from a transfer jack located within the aircraft.

L4. The method of paragraph L3, wherein the transferring the UAV to the restraint structure comprises transferring a carriage along with the UAV, wherein the carriage is positioned such that it supports and underlies the UAV.

L5. The method of any of paragraphs L3-L4, wherein the transferring the UAV to the restraint structure comprises moving the UAV from a storage structure within the aircraft.

L6. The method of any of paragraphs L1-L5, further comprising:
re-lowering the retrieval ramp from the aircraft to the extended configuration;
re-extending the tether towards the capture configuration;
moving a second UAV into the restraint structure coupled to the retrieval ramp;
transferring the restraint structure and the second UAV along the retrieval ramp and out of the aircraft;
releasing the second UAV by disengaging the capture connector from a second UAV connector coupled to the second UAV;
raising the retrieval ramp from the extended configuration towards the stowed configuration; and
retracting the tether towards the retracted configuration.
L7. The method of any of paragraphs L1-L6, wherein the releasing the UAV comprises releasing a plurality of respective UAVs, one after another.
L8. The method of any of paragraphs L1-L7, further comprising refueling, recharging, and/or reconfiguring one or more UAVs on the aircraft.
L9. The method of any of paragraphs L1-L8, wherein the releasing the UAV is performed in a location that avoids turbulence generated by the aircraft.

As used herein, a controller (e.g., controller 16) may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A system for capturing a UAV and loading the UAV into an aircraft while the aircraft is airborne, the system comprising:
a retrieval ramp having an elongate surface extending from a first end of the retrieval ramp to a terminal end of the retrieval ramp, wherein the retrieval ramp is configured to be selectively and reversibly moved between a stowed configuration in which the retrieval ramp is contained within the aircraft, and an extended configuration, in which the terminal end of the retrieval ramp is positioned outside of the aircraft and outside of turbulence generated by the aircraft for capture of the UAV;
a tether system having a tether extending from an initial tether end to a terminal tether end, wherein the tether system is selectively and reversibly moveable between a retracted configuration in which the terminal tether end is positioned inside the aircraft, and a capture configuration wherein the terminal tether end is positioned outside the aircraft, beyond the terminal end of the retrieval ramp; and
a capture connector coupled to the terminal tether end of the tether, wherein the capture connector is configured to engage the UAV outside of turbulence generated by the aircraft, and wherein the system is configured to move the UAV into the aircraft as the tether is retracted towards the retracted configuration, once the UAV is engaged with the capture connector.

2. The system according to claim 1, wherein the retrieval ramp further comprises a restraint structure configured to at least partially secure the UAV with respect to the elongate surface after capture of the UAV and while the UAV is moved towards the aircraft and through turbulence generated by the aircraft, wherein the restraint structure is configured to be selectively and reversibly moved with respect to the elongate surface of the retrieval ramp.

3. The system according to claim 2, wherein the restraint structure comprises one or more friction-reducing structures configured to reduce friction between the UAV and at least a portion of the restraint structure as the UAV is positioned within the restraint structure, wherein the one or more friction-reducing structures are configured to rotate when contacted by the UAV as the UAV is pulled into the restraint structure and the UAV is moved with respect to the one or more friction-reducing structures, thereby reducing friction between the UAV and the restraint structure.

4. The system according to claim 2, wherein the system further comprises a plurality of carriages, wherein each respective carriage is configured to longitudinally slide with respect to the elongate surface of the retrieval ramp, wherein each respective carriage is configured to provide support for a respective UAV during transfer of the respective UAV into the aircraft, such that the respective UAV is positioned between the carriage and the restraint structure of the retrieval ramp once the respective UAV is captured.

5. The system according to claim 4, wherein each respective carriage of the plurality of carriages is configured to be stored in a storage structure on the aircraft until use, wherein during use, the respective carriage is positioned on the elongate surface of the retrieval ramp and moved along with the restraint structure, with respect to the elongate surface of the retrieval ramp, to a position for capturing the next UAV, and wherein the respective carriage is configured to be stored in the storage structure with the captured UAV after capturing the respective UAV.

6. The system according to claim 5, further comprising a transfer jack configured to transfer a respective UAV between the retrieval ramp and the storage structure.

7. The system according to claim 2, wherein the tether is positioned such that it is disposed through the restraint structure of the retrieval ramp, when the tether system is in the capture configuration.

8. The system according to claim 2, wherein the tether system further comprises a drogue coupled to the terminal tether end of the tether, wherein the capture connector is disposed within the drogue, and wherein the capture connector is configured to engage with a UAV connector positioned on the UAV such that the drogue is configured to receive at least a portion of the UAV.

9. The system according to claim 8, wherein the restraint structure comprises a drogue-receiver adjacent a fore end region of the restraint structure, wherein the drogue-receiver is configured to engage the drogue of the tether system, wherein the drogue-receiver includes an opening through which the tether passes, wherein the opening is configured to prevent passage of the UAV and the drogue there through, and wherein the drogue-receiver is configured to be selectively and reversibly moved between a transfer configuration, in which the drogue-receiver is configured to prevent the UAV from being pulled off the fore end region of the restraint structure as the UAV is transferred into the aircraft, to a delivery configuration, in which the drogue-receiver is positioned such that the UAV may be transferred from the restraint structure into the aircraft, passing by the fore end region of the restraint structure.

10. The system according to claim 1, wherein the retrieval ramp comprises:
   a first ramp portion, the first ramp portion extending from the first end of the retrieval ramp to a second end of the first ramp portion;
   a second ramp portion extending from a proximal end of the second ramp portion to the terminal end of the retrieval ramp, wherein the second ramp portion is coupled to the first ramp portion adjacent the proximal end of the second ramp portion and the second end of the first ramp portion; and
   a frame positioned within the aircraft, wherein the first ramp portion is coupled to the frame, wherein the frame is configured to mount a vision system such that the vision system has a sufficient field of regard to facilitate capture of the UAV, and wherein the frame is configured to guide and position the tether of the tether system;
   wherein the second ramp portion and the first ramp portion are rotationally disposed with respect to one another, such that a ramp angle formed between the first ramp portion and the second ramp portion is adjustable, and such that the second ramp portion may be rotated with respect to the first ramp portion.

11. The system according to claim 1, wherein the system is configured to transfer a stored UAV out of the aircraft using the retrieval ramp and the tether system, and wherein the system is configured to release the UAV outside of the aircraft while the aircraft is airborne, by disengaging the capture connector from the UAV connector at a location outside of the aircraft.

12. The system according to claim 1, wherein the system is selectively and reversibly removable from the aircraft.

13. The system according to claim 1, further comprising a controller configured to selectively position the retrieval ramp in the stowed configuration, the extended configuration, and any position or arrangement between the stowed configuration and the extended configuration, and wherein the controller is configured to position the tether system in the retracted configuration, the capture configuration, and any position or arrangement between the retracted configuration and the capture configuration, and wherein the controller is configured to position the retrieval ramp and the tether system in response to measured relative positions and velocities of the aircraft and the UAV.

14. An aircraft comprising the system according to claim 1, wherein the aircraft is configured to capture the UAV while the UAV and the aircraft are airborne.

15. A method, comprising:
   removing the system of claim 1 from a first aircraft in which the system is installed; and
   installing the system in a second aircraft, the second aircraft being different from the first aircraft.

16. A method for capturing a UAV and loading the UAV into an aircraft while the aircraft is airborne, the method comprising:
   approaching the UAV with the aircraft;
   lowering a retrieval ramp from the aircraft towards an extended configuration;
   extending a tether towards a capture configuration, the tether having a capture connector coupled to a terminal tether end of the tether, wherein the capture connector is configured to engage the UAV, wherein, in the capture configuration, the capture connector is positioned beyond a terminal end of the retrieval ramp such that the tether is configured to capture the UAV outside of turbulence generated by the aircraft;
   measuring relative positions and velocities of the aircraft and the UAV;
   positioning the aircraft based on the measured relative positions and velocities;
   capturing the UAV by engaging the capture connector with a UAV connector coupled to the UAV; and
   moving the UAV into the aircraft via the tether and the retrieval ramp.

17. The method according to claim 16, further comprising:
   moving the UAV into a restraint structure of the retrieval ramp;
   transferring the restraint structure and the UAV along an elongate surface of the retrieval ramp and into the aircraft;
   raising the retrieval ramp from the extended configuration towards a stowed configuration; and
   retracting the tether towards a retracted configuration.

18. The method according to claim 17, further comprising moving a drogue-receiver of the restraint structure from a transfer configuration to a delivery configuration, wherein, in the transfer configuration, the drogue-receiver is configured to retain the drogue and the UAV within the restraint structure, and wherein, in the delivery configuration, the drogue-receiver is moved to allow passage of the drogue and the UAV through the restraint structure.

19. The method according to claim 17, further comprising:

transferring the UAV from the restraint structure onto a transfer jack located within the aircraft, wherein the transferring the UAV from the restraint structure comprises transferring a carriage along with the UAV, wherein the carriage is positioned such that it supports and underlies the UAV; and moving the UAV and the carriage to a storage structure within the aircraft.

20. The method according to claim 19, further comprising:

transferring a second carriage from the storage location to the restraint structure;

moving the drogue-receiver of the restraint structure from the delivery configuration to the transfer configuration;

re-lowering the retrieval ramp from the aircraft to the extended configuration;

re-extending the tether towards the capture configuration;

capturing a second UAV by engaging the capture connector with a second UAV connector coupled to the second UAV;

moving the second UAV into the restraint structure coupled to the retrieval ramp;

transferring the restraint structure and the second UAV along the retrieval ramp and into the aircraft;

raising the retrieval ramp from the extended configuration towards the stowed configuration; and retracting the tether towards the retracted configuration.

21. The method according to claim 16, wherein the capturing the UAV comprises capturing a plurality of respective UAVs, one after another.

* * * * *